(12) United States Patent
Shen et al.

(10) Patent No.: US 9,184,860 B2
(45) Date of Patent: Nov. 10, 2015

(54) TIME SYNCHRONIZATION METHOD AND SYSTEM, AND NODE DEVICE

(71) Applicant: Huawei Technologies Co., Ltd., Shenzhen (CN)

(72) Inventors: Xinyu Shen, Shenzhen (CN); Jianmei Zhang, Shenzhen (CN); Congqi Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 404 days.

(21) Appl. No.: 13/691,232

(22) Filed: Nov. 30, 2012

(65) Prior Publication Data

US 2013/0094523 A1    Apr. 18, 2013

Related U.S. Application Data

(63) Continuation of application No. PCT/CN2011/079530, filed on Sep. 9, 2011.

(51) Int. Cl.
*H04J 3/06* (2006.01)
*H04W 56/00* (2009.01)
*H04J 14/02* (2006.01)

(52) U.S. Cl.
CPC .............. *H04J 3/0658* (2013.01); *H04J 3/0667* (2013.01); *H04W 56/001* (2013.01); *H04J 14/0254* (2013.01)

(58) Field of Classification Search
CPC ... H04J 3/0658; H04J 3/0667; H04J 14/0254; H04W 56/001; H04W 56/0065
USPC ......... 370/310, 315, 316, 319, 321, 324, 351, 370/389, 395.1, 395.6, 395.61, 395.62, 464, 370/498, 503, 507, 508, 509; 455/39, 500, 455/501, 502
See application file for complete search history.

(56) References Cited

U.S. PATENT DOCUMENTS 6,621,832 B2 * 9/2003 Staats ........................... 370/503
2005/0232633 A1  10/2005 Haxell et al.
(Continued)

FOREIGN PATENT DOCUMENTS

CN    102098121 A    6/2011
CN    102104572 A    6/2011
(Continued)

OTHER PUBLICATIONS

International Search Report issued in corresponding PCT Application No. PCT/CN2011/079530; mailed Jun. 21, 2012.
(Continued)

*Primary Examiner* — Obaidul Huq
(74) *Attorney, Agent, or Firm* — Brinks Gilson & Lione

(57) ABSTRACT

The present disclosure discloses a time synchronization method. In the method, a first node sends a first time packet at a first time over a first working wavelength; a second node receives the first time packet at a second time. The first node sends a second time packet at a third time over a second working wavelength. The second node receives the second time packet at a fourth time; calculates an absolute time deviation between the second node and the first node according to the first time, the second time, the third time, the fourth time, a first signal transmission rate corresponding to the first working wavelength, and a second signal transmission rate corresponding to the second working wavelength, and synchronizes the local time between the second node and the first node. Further, a time synchronization system and a node device are disclosed.

22 Claims, 17 Drawing Sheets

(56) References Cited

U.S. PATENT DOCUMENTS

| | | | |
|---|---|---|---|
| 2006/0269028 A1* | 11/2006 | Bley et al. | 375/354 |
| 2007/0008993 A1* | 1/2007 | Cha et al. | 370/509 |
| 2008/0080563 A1 | 4/2008 | Kataria et al. | |
| 2010/0085990 A1* | 4/2010 | Belhadj et al. | 370/517 |

FOREIGN PATENT DOCUMENTS

| | | |
|---|---|---|
| CN | 102143571 A | 8/2011 |
| EP | 1802014 A1 | 6/2007 |
| EP | 2528254 A1 | 11/2012 |
| WO | WO 2011085585 A1 | 7/2011 |

OTHER PUBLICATIONS

"Draft Standard for Precision Clock Synchronization Protocol for Networked Measurement and Control Systems" The Electrical and Electronics Engineers, Inc. 2007.

Extended European Search Report issued in corresponding European Patent Application No. 11864604.1, mailed Jul. 11, 2013, 8 pages.

\* cited by examiner

TIME SYNCHRONIZATION METHOD AND SYSTEM, AND NODE DEVICE

CROSS-REFERENCE TO RELATED APPLICATIONS

This application is a continuation of International Application No. PCT/CN2011/079530, filed on Sep. 9, 2011, which is hereby incorporated by reference in its entirety.

FIELD

The present disclosure relates to network communication technologies and, in particular, to a time synchronization method and system, and a node device.

BACKGROUND

Currently, with promotion of the 3rd Generation (3rd Generation, 3G) mobile communication technology, Time Division-Synchronous Code Division Multiple Access (Time Division-Synchronous Code Division Multiple Access, TD-SCDMA) networks are operated. The TD-SCDMA not only requires frequency synchronization required by general cellular communication, but also requires time synchronization that is accurate to within ±1 us end to end. Meanwhile, the future 3G Long Term Evolution (Long Term Evolution, LTE) and Worldwide Interoperability for Microwave Access (Worldwide Interoperability for Microwave Access, Wimax) will also use the same time division duplexing (Time Division Duplexing, TDD) mode as the TD-SCDMA, and will also require phase and time synchronization. Therefore, it is urgently necessary to use the existing bearer network to implement precision time transfer.

A universal time transfer scheme in bearer networks is the 1588 protocol. Time synchronization and transparent transmission may be implemented by the 1588 protocol, and it is regarded as universal time transfer solution. The 1588 protocol calculates a path delay and an absolute time deviation between a master device and a slave device through a timestamp generated by exchanging time packets between the master device and the slave device, thereby accomplishing time synchronization between the master device and the slave device.

A prerequisite of using the 1588 protocol to implement network time synchronization is that the path delay in the receiving direction is the same as the path delay in the transmitting direction. In a practical network, however, the path delays in both directions are usually different, and it will cause the error of the absolute time deviation calculated through the 1588 protocol. The time precision required by the mobile network is not fulfilled unless the path delays in both directions are measured accurately and a time compensation is made properly.

Currently, a method for measuring the path delays in both directions is to use an optical time domain reflectometer (Optical Time Domain Reflectometer, OTDR) to measure the fiber length of the receiving line and the fiber length of the transmitting line between devices manually, calculate a time synchronization error, and correct the time synchronized by the 1588 protocol.

Such a method of accomplishing time synchronization by using the OTDR to measure and calculate the time synchronization error of the 1588 protocol and compensate for the time manually is complicated and inaccurate because fiber lengths of the lines in both directions needs to be measured between every two devices when the transmission path is changed by commissioning or deployment of network devices or by network maintenance.

SUMMARY

Embodiments of the present disclosure provide a time synchronization method, a time synchronization system, and a node device to implement precision time synchronization between nodes and solve the problem of time synchronization error caused by the difference between the path delay in the receiving direction and the path delay in the transmitting direction in the prior art.

The embodiments of the present disclosure are based on the following solutions:

A time synchronization method provided in an embodiment of the present disclosure includes: sending, by a first node, a first time packet at a first time over a first working wavelength; receiving, by a second node, the first time packet at a second time; sending, by the first node, a second time packet at a third time over a second working wavelength; receiving, by the second node, the second time packet at a fourth time; and obtaining an absolute time deviation between the second node and the first node according to the first time, the second time, the third time, the fourth time, a first signal transmission rate corresponding to the first working wavelength, and a second signal transmission rate corresponding to the second working wavelength, and synchronizing local time of the second node with local time of the first node.

Another time synchronization method provided in an embodiment of the present disclosure includes: sending, by a first node, a first time packet at a first time over a first working wavelength; receiving, by a second node, the first time packet at a second time; sending, by the first node, a second time packet at a third time over a second working wavelength; receiving, by the second node, the second time packet at a fourth time; and obtaining a time synchronization error between the second node and the first node according to the first time, the second time, the third time, the fourth time, a first signal transmission rate corresponding to the first working wavelength, a second signal transmission rate corresponding to the second working wavelength, a signal transmission rate of a wavelength used for transmitting an 1588 protocol packet from the first node to the second node, and a sum of a path delays in both directions between the first node and the second node as calculated through the 1588 protocol, and synchronizing local time of the second node with local time of the first node.

Another time synchronization method provided in an embodiment of the present disclosure includes: sending, by a first node, a first time packet at a first time over a first working wavelength, where the first time packet carries the first time; receiving, by a second node, the first time packet at a second time, and extracting the first time; sending, by the first node, a second time packet at a third time over a second working wavelength, where the second time packet carries the third time; receiving, by the second node, the second time packet at a fourth time, and extracting the third time; sending, by the second node, a third time packet at a fifth time over a third working wavelength; receiving, by the first node, the third time packet at a sixth time; sending, by the second node, a fourth time packet at a seventh time over a fourth working wavelength; receiving, by the first node, the fourth time packet at an eighth time; and obtaining, by the second node, a time synchronization error between the second node and the first node according to the first time, the second time, the third time, the fourth time, the fifth time, the sixth time, the seventh time, the eighth time, a first signal transmission rate corresponding to the first working wavelength, a second signal transmission rate corresponding to the second working wavelength, a third signal transmission rate corresponding to the third working wavelength, a fourth signal transmission rate corresponding to the fourth working wavelength, a signal transmission rate of a wavelength used for transmitting an 1588 protocol packet from the first node to the second node, and a signal transmission rate of a wavelength used for transmitting the 1588 protocol packet from the second node to the first node, and synchronizing local time of the second node with local time of the first node.

A node device provided in an embodiment of the present disclosure includes: a line processing module, configured to receive a first time packet sent by a first node over a first working wavelength, and a second time packet sent by the first node over a second working wavelength; a packet processing module, configured to: record receiving time of the first time packet and receiving time of the second time packet; resolve the first time packet and the second time packet, and extract sending time of the first time packet carried in the first time packet, and sending time of the second time packet carried in the second time packet; a time calculating module, configured to calculate an absolute time deviation between the node device and the first node according to the sending time of the first time packet, the sending time of the second time packet, the receiving time of the first time packet, the receiving time of the second time packet, a first signal transmission rate corresponding to the first working wavelength, and a second signal transmission rate corresponding to the second working wavelength; and a local time module, configured to: deliver the receiving time of the first time packet and the receiving time of the second time packet to the packet processing module; and subtract the absolute time deviation from local time of the node device to obtain local time synchronized to local time of the first node.

Another node device provided in an embodiment of the present disclosure includes: a line processing module, configured to send a first time packet to a second node over a first working wavelength, send a second time packet to the second node over a second working wavelength, and receive a third time packet sent by the second node; a packet processing module, configured to: encapsulate the first time packet and the second time packet, where the first time packet carries sending time of the first time packet, and the second time packet carries sending time of the second time packet; and resolve the third time packet and extract an absolute time deviation between the node device and the second node carried in the third time packet, where the absolute time deviation is calculated by the second node according to the sending time of the first time packet, the sending time of the second time packet, receiving time of the first time packet, receiving time of the second time packet, a first signal transmission rate corresponding to the first working wavelength, and a second signal transmission rate corresponding to the second working wavelength; and a local time module, configured to: deliver the sending time of the first time packet and the sending time of the second time packet to the packet processing module; and add the absolute time deviation to local time of the node device to obtain local time synchronized to local time of the second node.

Another node device provided in an embodiment of the present disclosure includes: a line processing module, configured to send a first time packet to a second node over a first working wavelength, send a second time packet to the second node over a second working wavelength, and receive a fourth time packet sent by the second node; a packet processing module, configured to: encapsulate the first time packet and the second time packet, and record sending time of the first time packet and sending time of the second time packet; resolve the fourth time packet, and extract receiving time of the first time packet and receiving time of the second time packet carried in the fourth time packet; a time calculating module, configured to calculate an absolute time deviation between the node device and the second node according to the sending time of the first time packet, the sending time of the second time packet, the receiving time of the first time packet, the receiving time of the second time packet, a first signal transmission rate corresponding to the first working wavelength, and a second signal transmission rate corresponding to the second working wavelength; and a local time module, configured to: deliver the sending time of the first time packet and the sending time of the second time packet to the packet processing module; and add the absolute time deviation to local time of the node device to obtain local time synchronized to local time of the second node.

Another node device provided in an embodiment of the present disclosure includes: a line processing module, configured to receive a first time packet sent by a first node over a first working wavelength, and a second time packet sent by the first node over a second working wavelength; a packet processing module, configured to: record receiving time of the first time packet and receiving time of the second time packet; resolve the first time packet and the second time packet, and extract sending time of the first time packet carried in the first time packet, and sending time of the second time packet carried in the second time packet; an 1588 protocol module, configured to execute the 1588 protocol to obtain a sum of path delays in both directions between the first node and the second node, and synchronize local time of the node device to local time of the first node through the 1588 protocol; a time calculating module, configured to calculate a time synchronization error between the node device and the first node according to the sending time of the first time packet, the sending time of the second time packet, the receiving time of the first time packet, the receiving time of the second time packet, a first signal transmission rate corresponding to the first working wavelength, a second signal transmission rate corresponding to the second working wavelength, a signal transmission rate of a wavelength used for transmitting an 1588 protocol packet from the first node to the second node, and the sum of path delays in both directions; and a local time module, configured to: deliver the receiving time of the first time packet and the receiving time of the second time packet to the packet processing module, deliver the local time to the 1588 protocol module, and add the time synchronization error to the node device's local time synchronized through the 1588 protocol.

Another node device provided in an embodiment of the present disclosure includes: a line processing module, configured to send a first time packet to a second node over a first working wavelength, send a second time packet to the second node over a second working wavelength, and receive a sixth time packet sent by the second node; a packet processing module, configured to: encapsulate the first time packet and the second time packet, where the first time packet carries sending time of the first time packet, and the second time packet carries sending time of the second time packet; and resolve the sixth time packet and extract a line distance from the first node to the second node or a path delay of transmitting an 1588 protocol packet from the first node to the second node carried in the sixth time packet, where the line distance from the first node to the second node is calculated by the second node according to the sending time of the first time packet, the sending time of the second time packet, receiving time of the first time packet, receiving time of the second time packet, a first signal transmission rate corresponding to the first working wavelength, and a second signal transmission rate corresponding to the second working wavelength; the path delay of transmitting the 1588 protocol packet from the first node to the second node is calculated by the second node according to the sending time of the first time packet, the sending time of the second time packet, the receiving time of the first time packet, the receiving time of the second time packet, the first signal transmission rate corresponding to the first working wavelength, the second signal transmission rate corresponding to the second working wavelength, and a signal transmission rate of a wavelength used for transmitting the 1588 protocol packet from the first node to the second node; an 1588 protocol module, configured to execute the 1588 protocol to obtain a sum of path delays in both directions between the first node and the second node, and synchronize local time of the node device to local time of the second node through the 1588 protocol; a time calculating module, configured to calculate a time synchronization error between the second node and the first node according to: the line distance from the first node to the second node, the signal transmission rate of the wavelength used for transmitting the 1588 protocol packet from the first node to the second node, and the sum of path delays in both directions between the first node and the second node; or according to: the path delay of transmitting the 1588 protocol packet from the first node to the second node, and the sum of path delays in both directions between the first node and the second node; and a local time module, configured to: deliver the sending time of the first time packet and the sending time of the second time packet to the packet processing module, deliver the local time to the 1588 protocol module, and subtract the time synchronization error from the node device's local time synchronized through the 1588 protocol.

Another node device provided in an embodiment of the present disclosure includes: a line processing module, configured to: receive a first time packet sent by a first node over a first working wavelength and a second time packet sent by the first node over a second working wavelength; send a third time packet to the first node over a third working wavelength, and send a fourth time packet to the first node over a fourth working wavelength; and receive an eighth time packet sent by the first node; a packet processing module, configured to: record receiving time of the first time packet and receiving time of the second time packet; resolve the first time packet and the second time packet, and extract sending time of the first time packet carried in the first time packet, and sending time of the second time packet carried in the second time packet; encapsulate the third time packet and the fourth time packet, where the third time packet carries sending time of the third time packet, and the fourth time packet carries sending time of the fourth time packet; and resolve the eighth time packet and extract a path delay of transmitting an 1588 protocol packet from the second node to the first node carried in the eighth time packet, where the path delay of transmitting the 1588 protocol packet from the second node to the first node is calculated by the first node according to the sending time of the third time packet, the sending time of the fourth time packet, the receiving time of the third time packet, the receiving time of the fourth time packet, a third transmission rate corresponding to the third working wavelength, a fourth transmission rate corresponding to the fourth working wavelength, and a signal transmission rate of a wavelength used for transmitting the 1588 protocol packet from the second node to the first node;

an 1588 protocol module, configured to execute the 1588 protocol, and synchronize local time of the node device to local time of the first node through the 1588 protocol;

a time calculating module, configured to calculate a time synchronization error between the second node and the first node according to the sending time of the first time packet, the sending time of the second time packet, the receiving time of the first time packet, the receiving time of the second time packet, a first signal transmission rate corresponding to the first working wavelength, a second signal transmission rate corresponding to the second working wavelength, the path delay of transmitting the 1588 protocol packet from the second node to the first node, the signal transmission rate of the wavelength used for transmitting the 1588 protocol packet from the first node to the second node; and a local time module, configured to: deliver the receiving time of the first time packet, the receiving time of the second time packet, the sending time of the third time packet, and the sending time of the fourth time packet to the packet processing module, deliver the local time to the 1588 protocol module, and add the time synchronization error to the node device's local time synchronized through the 1588 protocol.

A time synchronization system provided in an embodiment of the present disclosure includes at least two node devices, where:

A first node device is configured to send a first time packet to a second node device over a first working wavelength, where the first time packet carries sending time of the first time packet; and send a second time packet to the second node device over a second working wavelength, where the second time packet carries sending time of the second time packet; and The second node device is configured to: receive the first time packet sent by the first node device over the first working wavelength, and the second time packet sent by the first node device over the second working wavelength; record receiving time of the first time packet and receiving time of the second time packet; extract the sending time of the first time packet carried in the first time packet and extract the sending time of the second time packet carried in the second time packet; calculate an absolute time deviation between the second node device and the first node device according to the sending time of the first time packet, the sending time of the second time packet, the receiving time of the first time packet, the receiving time of the second time packet, a first signal transmission rate corresponding to the first working wavelength, and a second signal transmission rate corresponding to the second working wavelength; subtract the absolute time deviation from local time of the second node device to obtain local time synchronous to local time of the first node device.

Another time synchronization system provided in an embodiment of the present disclosure includes at least two node devices, where:

A first node device is configured to: send a first time packet to a second node device over a first working wavelength, where the first time packet carries sending time of the first time packet; and send a second time packet to the second node device over a second working wavelength, where the second time packet carries sending time of the second time packet; receive a third time packet sent by the second node device, and extract an absolute time deviation between the second node device and the first node device carried in the third time packet; add the absolute time deviation to local time of the first node device to obtain local time synchronized to local time of the second node device; and The second node device is configured to: receive the first time packet sent by the first node device over the first working wavelength, and the second time packet sent by the first node device over the second working wavelength; record receiving time of the first time packet and receiving time of the second time packet; extract the sending time of the first time packet carried in the first time packet and extract the sending time of the second time packet carried in the second time packet; calculate an absolute time deviation between the second node device and the first node device according to the sending time of the first time packet, the sending time of the second time packet, the receiving time of the first time packet, the receiving time of the second time packet, a first signal transmission rate corresponding to the first working wavelength, and a second signal transmission rate corresponding to the second working wavelength; and send the third time packet that carries the absolute time deviation to the first node device.

Another time synchronization system provided in an embodiment of the present disclosure includes at least two node devices, where:

A first node device is configured to: send a first time packet to a second node device over a first working wavelength, and send a second time packet to the second node device over a second working wavelength; record sending time of the first time packet and sending time of the second time packet; receive a fourth time packet sent by the second node device, and extract a receiving time of the first time packet and a receiving time of the second time packet carried in the fourth time packet; calculate an absolute time deviation between the second node device and the first node device according to the sending time of the first time packet, the sending time of the second time packet, the receiving time of the first time packet, the receiving time of the second time packet, a first signal transmission rate corresponding to the first working wavelength, and a second signal transmission rate corresponding to the second working wavelength; add the absolute time deviation to local time of the first node device to obtain local time synchronized to local time of the second node device; and The second node device is configured to: receive the first time packet sent by the first node device over the first working wavelength, and the second time packet sent by the first node device over the second working wavelength; send the fourth time packet to the first node device, where the fourth time packet carries the receiving time of the first time packet and the receiving time of the second time packet.

Another time synchronization system provided in an embodiment of the present disclosure includes at least two node devices, where:

A first node device is configured to send a first time packet to a second node device over a first working wavelength, where the first time packet carries sending time of the first time packet; and send a second time packet to the second node device over a second working wavelength, where the second time packet carries sending time of the second time packet; and The second node device is configured to: receive the first time packet sent by the first node device over the first working wavelength, and the second time packet sent by the first node device over the second working wavelength; record receiving time of the first time packet and receiving time of the second time packet; extract the sending time of the first time packet carried in the first time packet and extract the sending time of the second time packet carried in the second time packet; obtain a sum of path delays in both directions between the first node and the second node through the 1588 protocol; calculate a time synchronization error between the second node device and the first node device according to the sending time of the first time packet, the sending time of the second time packet, the receiving time of the first time packet, the receiving time of the second time packet, a first signal transmission rate corresponding to the first working wavelength, a second signal transmission rate corresponding to the second working wavelength, a signal transmission rate of a wavelength used for transmitting an 1588 protocol packet from the first node device to the second node device, and the sum of path delays in both directions between the first node and the second node; and add the time synchronization error to the second node device's local time synchronized through the 1588 protocol.

Another time synchronization system provided in an embodiment of the present disclosure includes at least two node devices, where:

A first node device is configured to: send a first time packet to a second node device over a first working wavelength, where the first time packet carries sending time of the first time packet; send a second time packet to the second node device over a second working wavelength, where the second time packet carries sending time of the second time packet; receive a sixth time packet sent by the second node device, and extract a line distance from the first node device to the second node device or a path delay of transmitting an 1588 protocol packet from the first node device to the second node device, where the line distance or the path delay is calculated by the second node device and carried in the sixth time packet; obtain a sum of path delays in both directions between the first node device and the second node device through the 1588 protocol; calculate a time synchronization error between the second node device and the first node device according to: the line distance from the first node device to the second node device, the signal transmission rate of the wavelength used for transmitting the 1588 protocol packet from the first node device to the second node device, and the sum of the path delays in both directions, or according to: the path delay of transmitting the 1588 protocol packet from the first node device to the second node device, and the sum of the path delays in both directions; and subtract the time synchronization error from the first node device's local time synchronized through the 1588 protocol; and The second node device is configured to: receive the first time packet sent by the first node device over the first working wavelength, and the second time packet sent by the first node device over the second working wavelength; record receiving time of the first time packet and receiving time of the second time packet; extract the sending time of the first time packet carried in the first time packet and extract the sending time of the second time packet carried in the second time packet;

calculate the line distance from the first node device to the second node device according to the sending time of the first time packet, the sending time of the second time packet, the receiving time of the first time packet, the receiving time of the second time packet, a first signal transmission rate corresponding to the first working wavelength, and a second signal transmission rate corresponding to the second working wavelength; or, calculate the path delay of transmitting the 1588 protocol packet from the first node device to the second node device according to the sending time of the first time packet, the sending time of the second time packet, the receiving time of the first time packet, the receiving time of the second time packet, the first signal transmission rate corresponding to the first working wavelength, the second signal transmission rate corresponding to the second working wavelength, and the signal transmission rate of the wavelength used for transmitting the 1588 protocol packet from the first node device to the second node device; and send a sixth time packet to the first node device, where the sixth time packet carries the line distance from the first node device to the second node device or the path delay of transmitting the 1588 protocol packet from the first node device to the second node device.

Another time synchronization system provided in an embodiment of the present disclosure includes at least two node devices, where:

A first node device is configured to: send a first time packet to a second node device over a first working wavelength, where the first time packet carries sending time of the first time packet; send a second time packet to the second node device over a second working wavelength, where the second time packet carries sending time of the second time packet; receive a third time packet sent by the second node device over a third working wavelength, and a fourth time packet sent by the second node device over a fourth working wavelength; record receiving time of the third time packet and receiving time of the fourth time packet; extract sending time of the third time packet carried in the third time packet and extract sending time of the fourth time packet carried in the fourth time packet; calculate a path delay of transmitting an 1588 protocol packet from the second node device to the first node device according to the sending time of the third time packet, the sending time of the fourth time packet, the receiving time of the third time packet, the receiving time of the fourth time packet, a third transmission rate corresponding to the third working wavelength, a fourth transmission rate corresponding to the fourth working wavelength, and a signal transmission rate of a wavelength used for transmitting the 1588 protocol packet from the second node device to the first node device; send an eighth time packet to the second node device, where the eighth time packet carries the path delay of transmitting the 1588 protocol packet from the second node device to the first node device; and The second node device is configured to: receive the first time packet sent by the first node device over the first working wavelength, and the second time packet sent by the first node device over the second working wavelength; record receiving time of the first time packet and receiving time of the second time packet; extract the sending time of the first time packet carried in the first time packet and extract the sending time of the second time packet carried in the second time packet; send the third time packet to the first node device over the third working wavelength, where the third time packet carries the sending time of the third time packet; send the fourth time packet to the first node device over the fourth working wavelength, where the fourth time packet carries the sending time of the fourth time packet; receive the eighth time packet sent by the first node device, and extract the path delay of transmitting the 1588 protocol packet from the second node device to the first node device carried in the eighth time packet; calculate a time synchronization error between the second node device and the first node device according to the sending time of the first time packet, the sending time of the second time packet, the receiving time of the first time packet, the receiving time of the second time packet, a first signal transmission rate corresponding to the first working wavelength, a second signal transmission rate corresponding to the second working wavelength, the path delay of transmitting the 1588 protocol packet from the second node device to the first node device, a signal transmission rate of a wavelength used for transmitting the 1588 protocol packet from the first node device to the second node device; and add the time synchronization error to the second node device's local time synchronized through the 1588 protocol.

The time synchronization method, the time synchronization system, and the node device provided in embodiments of the present disclosure implement precision time synchronization between nodes, and solve the problem of time synchronization error caused by the difference between the path delay in the receiving direction and the path delay in the transmitting direction in the prior art. The solutions are easy to implement and highly practicable, and provide high measurement accuracy.

BRIEF DESCRIPTION OF THE DRAWINGS

To make embodiments of the present disclosure more comprehensible, the following outlines the accompanying drawings used in description of the embodiments. Evidently, the outlined accompanying drawings are not exhaustive, and persons skilled in the art can derive other drawings from them without any creative effort.

DETAILED DESCRIPTION OF THE EMBODIMENTS

The following detailed description is given in conjunction with the accompanying drawings in order to provide a thorough understanding of a time synchronization method, a time synchronization system, and a node device according to embodiments of the present disclosure.

Evidently, the embodiments described herein are illustrative in nature rather than exhaustive. All other embodiments, which can be derived by persons skilled in the art from the embodiments given herein without any creative effort, shall fall within the protection scope of the present disclosure.

In a bearer network, a local time of the time synchronization master node is not synchronized with a local time of the time synchronization slave node.

Figure 1A:
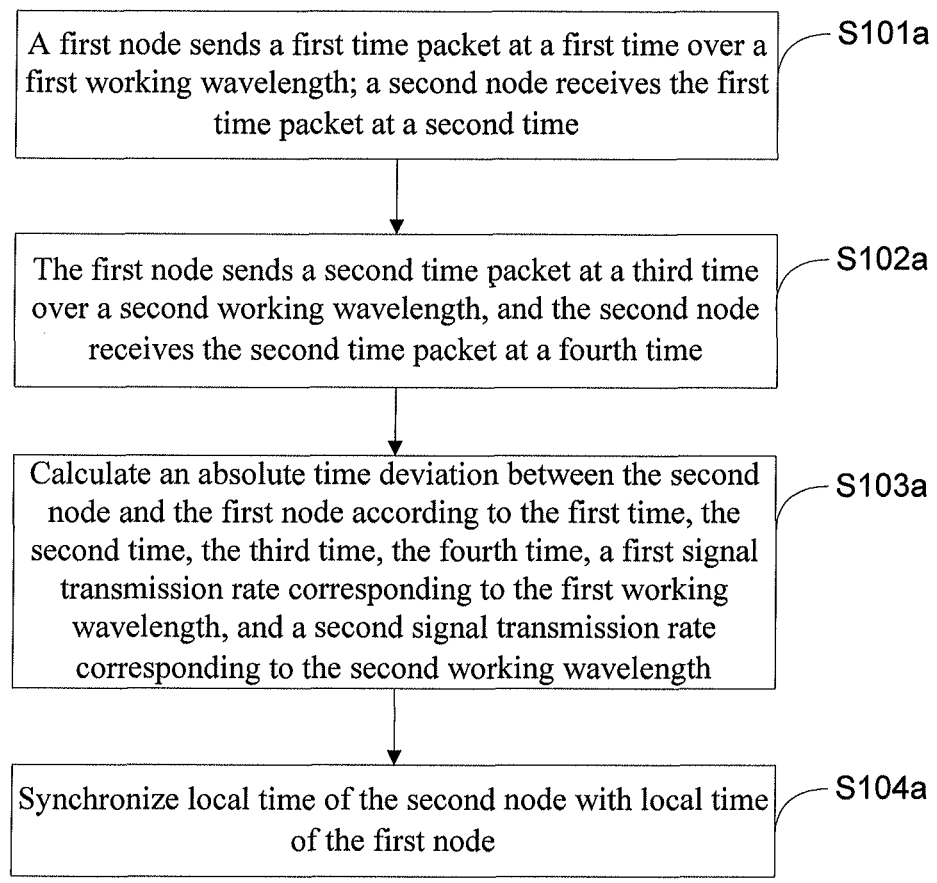
FIG. 1a is a schematic flowchart of a time synchronization method according to an embodiment of the present disclosure.

FIG. 1a shows a procedure of a time synchronization method according to an embodiment of the present disclosure. The method includes the following steps:

Step S101a: A first node sends a first time packet at a first time over a first working wavelength, and a second node receives the first time packet at a second time.

Step S102a: The first node sends a second time packet at a third time over a second working wavelength, and the second node receives the second time packet at a fourth time.

Step S103a: Calculate an absolute time deviation between the second node and the first node according to the first time, the second time, the third time, the fourth time, a first signal transmission rate corresponding to the first working wavelength, and a second signal transmission rate corresponding to the second working wavelength.

Step S104a: Synchronize local time of the second node with local time of the first node.

Figure 1B:
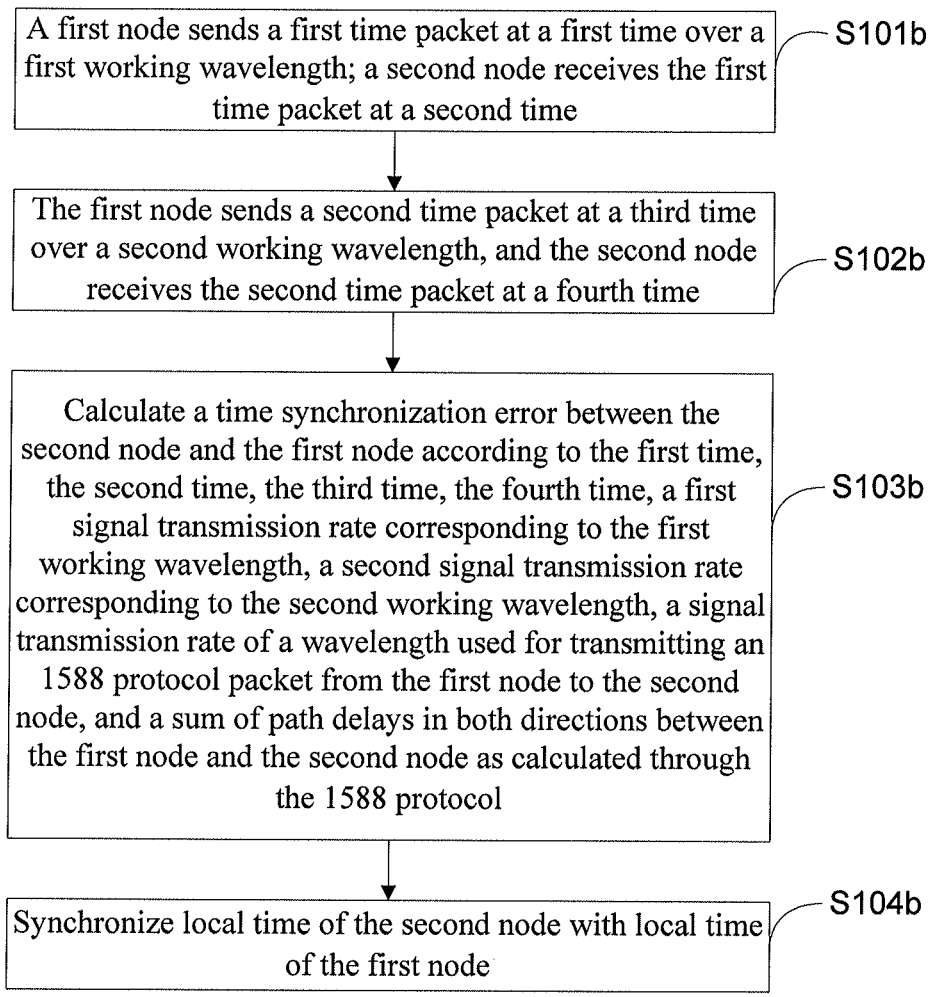
FIG. 1b is a schematic flowchart of a time synchronization method according to another embodiment of the present disclosure.

FIG. 1b shows a procedure of a time synchronization method according to another embodiment of the present disclosure. The method includes the following steps:

Step S101b: A first node sends a first time packet at a first time over a first working wavelength, and a second node receives the first time packet at a second time.

Step S102b: The first node sends a second time packet at a third time over a second working wavelength, and the second node receives the second time packet at a fourth time.

Step S103b: Calculate a time synchronization error between the second node and the first node according to the first time, the second time, the third time, the fourth time, a first signal transmission rate corresponding to the first working wavelength, a second signal transmission rate corresponding to the second working wavelength, a signal transmission rate of a wavelength used for transmitting an 1588 protocol packet from the first node to the second node, and a sum of path delays in both directions between the first node and the second node as calculated through the 1588 protocol.

Step S104b: Synchronize local time of the second node with local time of the first node.

Figure 1C:
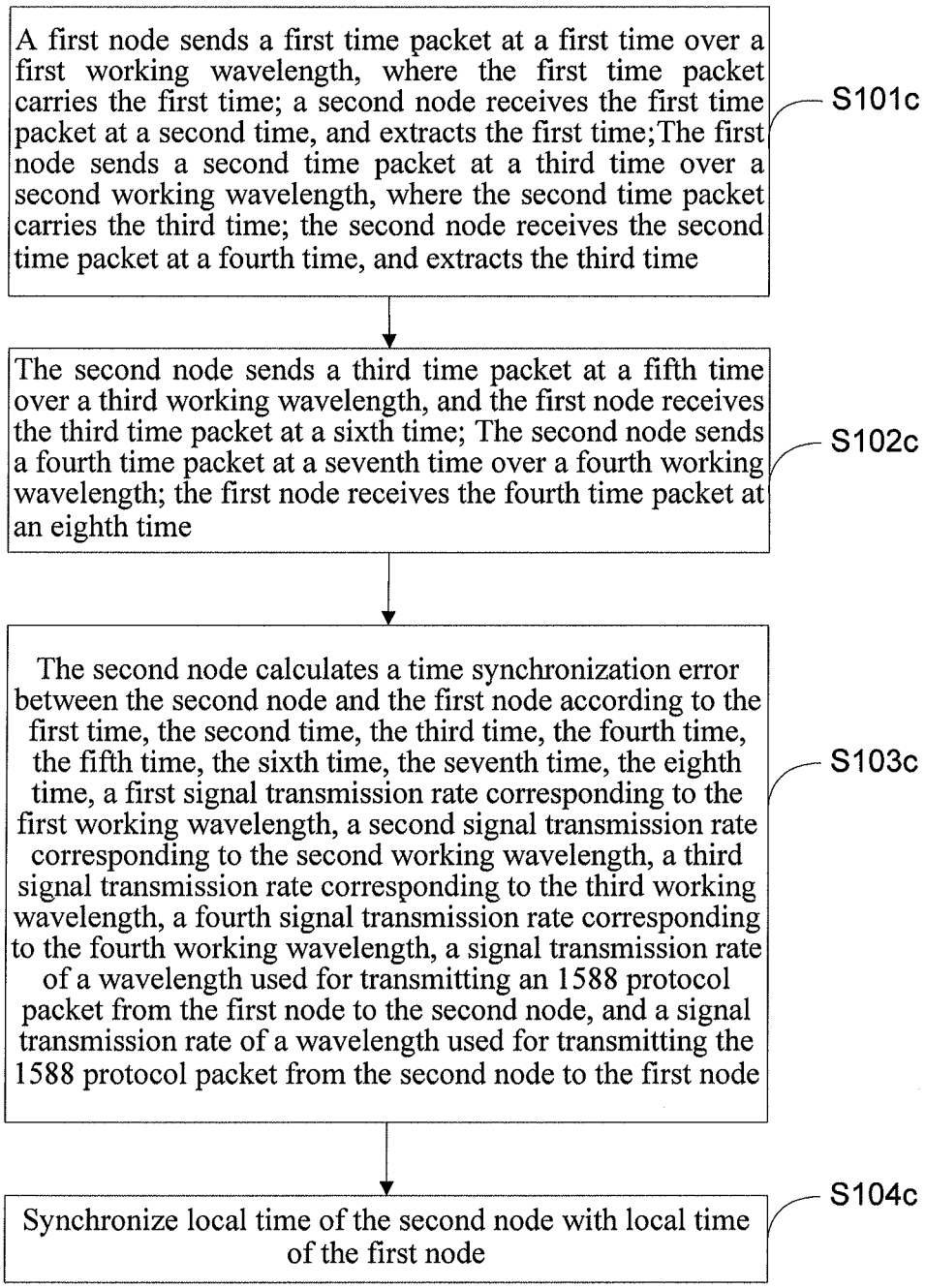
FIG. 1c is a schematic flowchart of a time synchronization method according to another embodiment of the present disclosure.

FIG. 1c shows a procedure of a time synchronization method according to another embodiment of the present disclosure. The method includes the following steps:

Step S101c: A first node sends a first time packet at a first time over a first working wavelength, where the first time packet carries the first time; a second node receives the first time packet at a second time, and extracts the first time.

The first node sends a second time packet at a third time over a second working wavelength, where the second time packet carries the third time; the second node receives the second time packet at a fourth time, and extracts the third time.

Step S102c: The second node sends a third time packet at a fifth time over a third working wavelength, and the first node receives the third time packet at a sixth time.

The second node sends a fourth time packet at a seventh time over a fourth working wavelength; the first node receives the fourth time packet at an eighth time.

Step S103c: The second node calculates a time synchronization error between the second node and the first node according to the first time, the second time, the third time, the fourth time, the fifth time, the sixth time, the seventh time, the eighth time, a first signal transmission rate corresponding to the first working wavelength, a second signal transmission rate corresponding to the second working wavelength, a third signal transmission rate corresponding to the third working wavelength, a fourth signal transmission rate corresponding to the fourth working wavelength, a signal transmission rate of a wavelength used for transmitting an 1588 protocol packet from the first node to the second node, and a signal transmission rate of a wavelength used for transmitting the 1588 protocol packet from the second node to the first node.

Step S104c: Synchronize local time of the first node with local time of the second node.

For ease of understanding the following embodiments, meanings of symbols used in the embodiments are outlined below:

T1 represents the local time of the first node;

T2 represents the local time of the second node;

T1' represents the local time synchronized to the local time of the second node when the first node is a slave node;

T2' represents the local time synchronized to the local time of the first node when the second node is a slave node;

$T1_{1588}$ represents the local time synchronized through the 1588 protocol when the first node is a slave node;

$T2_{1588}$ represents the local time synchronized through the 1588 protocol when the second node is a slave node;

$V_{1-2}$ represents the signal transmission rate of the wavelength used for transmitting an 1588 protocol packet from the first node to the second node;

$V_{2-1}$ represents the signal transmission rate of the wavelength used for transmitting an 1588 protocol packet from the second node to the first node;

$L_{1-2}$ represents the line distance from the first node to the second node;

$L_{2-1}$ represents the line distance from the second node to the first node;

$d_{1-2}$ represents the path delay of transmitting a 1588 protocol packet from the first node to the second node;

$d_{2-1}$ represents the path delay of transmitting a 1588 protocol packet from the second node to the first node;

D represents a sum of the path delays in both directions between the first node and the second node, namely, the sum of $d_{1-2}$ and $d_{2-1}$;

Offset represents an absolute time deviation between the second node and the first node; and ΔT represents a time synchronization error between the second node and the first node.

It should be noted that on a node that runs the 1588 protocol, $V_{1-2}$ and $V_{2-1}$ are known and available for receiving or sending 1588 protocol packets.

Embodiment 1

Figure 2:
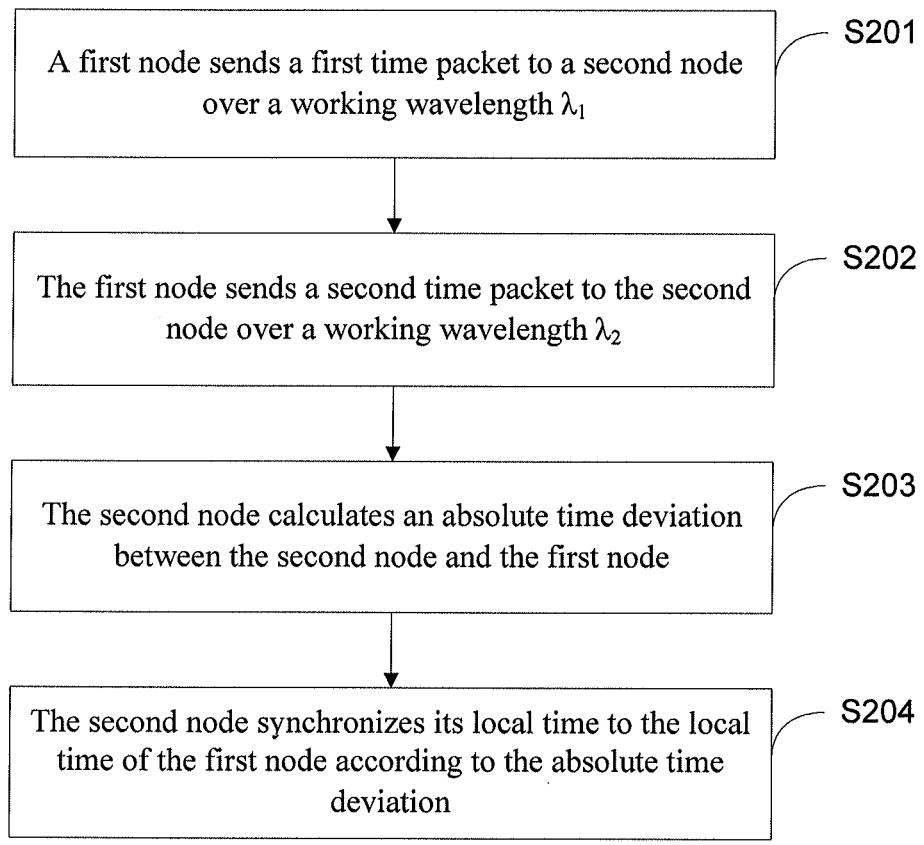
FIG. 2 is a flowchart of a time synchronization method according to a first embodiment of the present disclosure.

This embodiment provides a time synchronization method, whose procedure is shown in FIG. 2, in which the first node is a master node, and the second node is a slave node. The method includes the following steps:

Step S201: A first node sends a first time packet to a second node over a working wavelength $\lambda_1$.

In this embodiment, at the local time $t_{11}$, the first node sends the first time packet to the second node over the working wavelength $\lambda_1$, where the first time packet carries the sending time $t_{11}$ of the packet; the second node receives the first time packet at the local time $t_{12}$, and extracts the sending time $t_{11}$ of the first time packet carried in the first time packet.

A signal transmission rate corresponding to a working wavelength is definite. If the transmission rate of a signal over the working wavelength $\lambda_1$ on the line is $v_1$, it follows that:

$$t_{12} - t_{11} = \frac{L_{1-2}}{v_1} + \text{Offset} \quad (1)$$

Step S202: The first node sends a second time packet to the second node over a working wavelength $\lambda_2$.

In this embodiment, at the local time $t_{21}$, the first node sends the second time packet to the second node over the working wavelength $\lambda_2$, where the second time packet carries the sending time $t_{21}$ of the packet; the second node receives the second time packet at the local time $t_{22}$, and extracts the sending time $t_{21}$ of the second time packet carried in the second time packet.

The signal transmission rate corresponding to a working wavelength is definite. If the transmission rate of a signal over the working wavelength $\lambda_2$ on the line is $v_2$, it follows that:

$$t_{22} - t_{21} = \frac{L_{1-2}}{v_2} + \text{Offset} \quad (2)$$

Step S203: The second node calculates an absolute time deviation between the second node and the first node.

In this embodiment, the second node calculates the absolute time deviation Offset between the second node and the first node based on formulas (1) and (2) according to the sending time $t_{11}$ of the first time packet, the sending time $t_{21}$ of the second time packet, the receiving time $t_{12}$ of the first time packet, the receiving time $t_{22}$ of the second time packet, a first signal transmission rate $v_1$, and a second signal transmission rate $v_2$:

$$\text{Offset} = \frac{(t_{12} - t_{11}) \times v_1 - (t_{22} - t_{21}) \times v_2}{v_1 - v_2} \quad (3)$$

Step S204: The second node synchronizes its local time to the local time of the first node according to the absolute time deviation.

In this embodiment, the second node compensates for its local time according to the calculated absolute time deviation Offset, and synchronizes its local time to the local time of the first node.

The synchronized local time of the second node is T2'=T2−Offset. That is, the second node subtracts the absolute time deviation Offset from the local time T2 of the second node to obtain the local time T2' synchronized to the local time of the first node.

Embodiment 2

Figure 3:
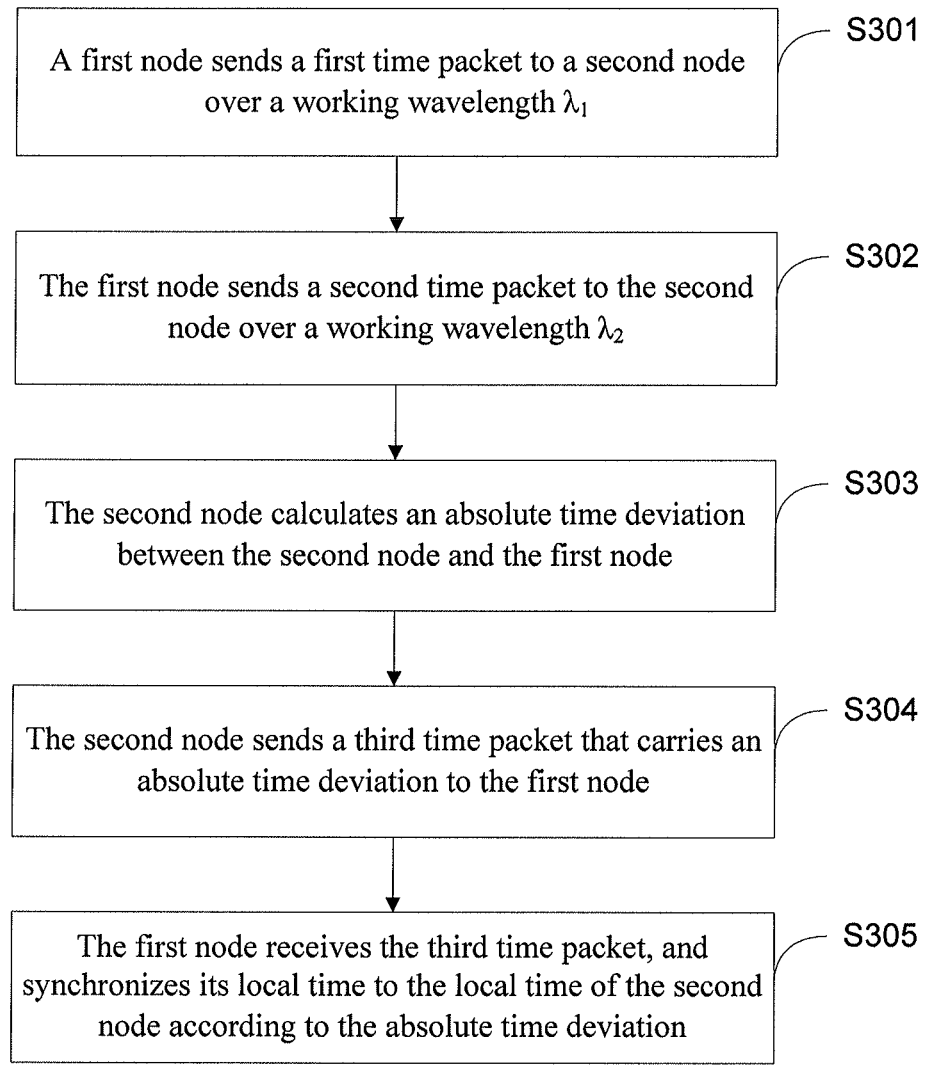
FIG. 3 is a flowchart of a time synchronization method according to a second embodiment of the present disclosure.

This embodiment provides a time synchronization method, whose procedure is shown in FIG. 3, in which the first node is a slave node, and the second node is a master node. The method includes the following steps:

Steps S301, S302, and S303 in this embodiment are similar to steps S201, S202, and S203 in embodiment 1 respectively, and are not repeated here any further.

Step S304: The second node sends a third time packet that carries an absolute time deviation to the first node.

In this embodiment, the second node sends the third time packet to the first node, where the third time packet carries the absolute time deviation Offset between the second node and the first node, and the absolute time deviation is calculated by the second node. This embodiment does not restrict the format of the third time packet or the type of working wavelength that bears the packet.

Step S305: The first node receives the third time packet, and synchronizes its local time to the local time of the second node according to the absolute time deviation.

The first node receives the third time packet sent by the second node, extracts the absolute time deviation Offset carried in the third time packet, compensates for its local time according to the absolute time deviation Offset, and synchronizes the local time of the first node to the local time of the second node.

The synchronized local time of the first node is T1'=T1+Offset. That is, the first node adds the absolute time deviation Offset to the local time T1 of the first node to obtain the local time T1' synchronized to the local time of the second node.

Embodiment 3

Figure 4:
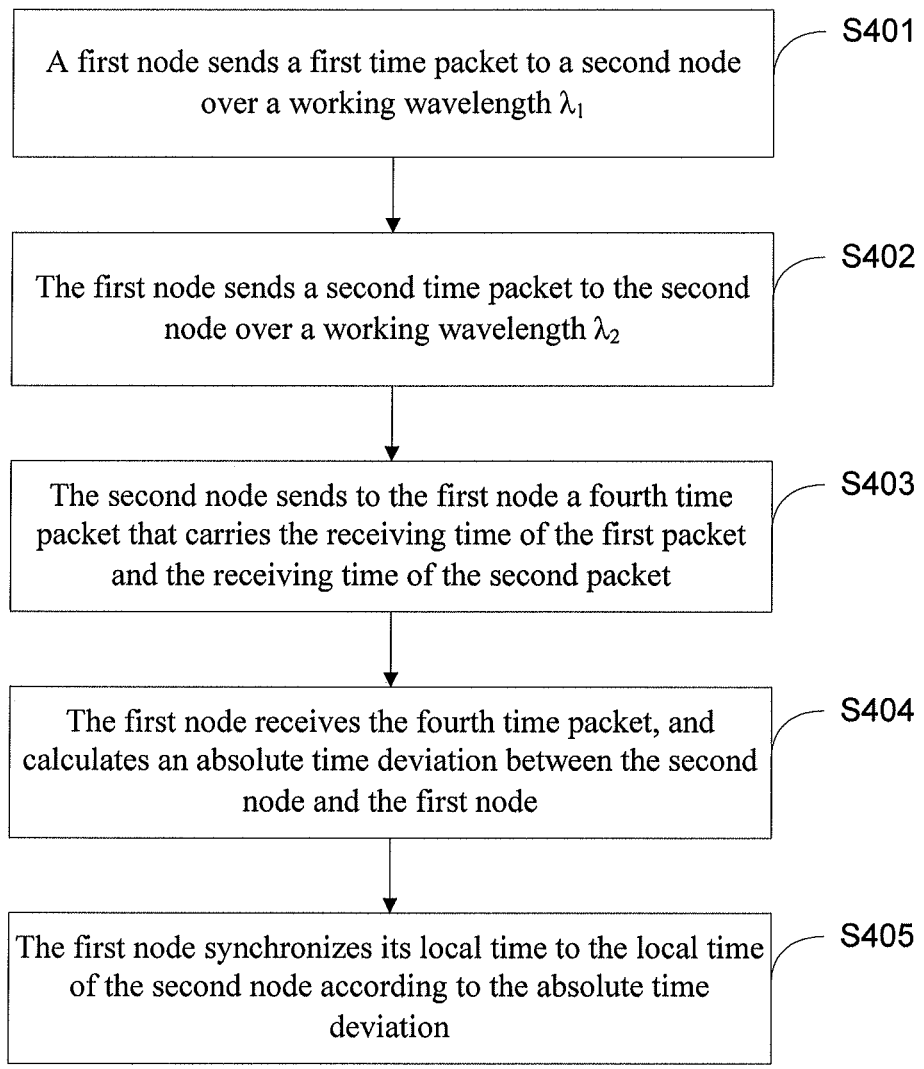
FIG. 4 is a flowchart of a time synchronization method according to a third embodiment of the present disclosure.

This embodiment provides a time synchronization method, whose procedure is shown in FIG. 4, in which the first node is a slave node, and the second node is a master node. The method includes the following steps:

Step S401: A first node sends a first time packet to a second node over a working wavelength $\lambda_1$.

In this embodiment, the first node sends the first time packet to the second node at the local time $t_{11}$ over the working wavelength $\lambda_1$, and the second node receives the first time packet at the local time $t_{12}$.

A signal transmission rate corresponding to a working wavelength is definite. If the transmission rate of a signal over the working wavelength $\lambda_1$ on the line is $v_1$, formula (1) in step S201 in embodiment 1 is also applicable here.

Step S402: The first node sends a second time packet to the second node over a working wavelength $\lambda_2$.

In this embodiment, the first node sends the second time packet to the second node at the local time $t_{21}$ over the working wavelength $\lambda_2$, and the second node receives the second time packet at the local time $t_{22}$.

A signal transmission rate corresponding to a working wavelength is definite. If the transmission rate of a signal over the working wavelength $\lambda_2$ on the line is $v_2$, formula (2) in step S202 in embodiment 1 is also applicable here.

Step S403: The second node sends to the first node a fourth time packet that carries the receiving time of the first packet and the receiving time of the second packet.

In this embodiment, after receiving the first time packet and the second time packet, the second node sends the fourth time packet to the first node. The fourth time packet carries the receiving time $t_{12}$ of the first time packet at the second node and the receiving time $t_{22}$ of the second time packet at the second node. This embodiment does not restrict the format of the fourth time packet or the type of working wavelength that bears the packet.

Step S404: The first node receives the fourth time packet, and calculates an absolute time deviation between the second node and the first node.

In this embodiment, the first node receives the fourth time packet sent by the second node, extracts the receiving time $t_{12}$ of the first time packet and the receiving time $t_{22}$ of the second time packet carried in the fourth time packet, and calculates the absolute time deviation Offset between the second node and the first node based on formulas (1) and (2) according to the sending time $t_{11}$ of the first time packet, the sending time $t_{21}$ of the second time packet, the first signal transmission rate $v_1$, and the second signal transmission rate $v_2$:

$$\text{Offset} = \frac{(t_{12} - t_{11}) \times v_1 - (t_{22} - t_{21}) \times v_2}{v_1 - v_2} \quad (3)$$

Step S405: The first node synchronizes its local time to the local time of the second node according to the absolute time deviation.

In this embodiment, the first node compensates for its local time according to the calculated absolute time deviation Offset, and synchronizes its local time to the local time of the second node.

The synchronized local time of the first node is T1'=T1+Offset. That is, the first node adds the absolute time deviation Offset to the local time T1 of the first node to obtain the local time T1' synchronized to the local time of the second node.

The solutions provided in embodiments 1, 2, and 3 above are independent of the 1588 protocol, implement automatic real-time measurement of the absolute time deviation between a master node and a slave node by sending time packets over at least two wavelengths of a unidirectional path, accomplish precision time synchronization between nodes, and solve the problem of time synchronization errors caused by the difference between the path delays in both directions in the prior art. The solutions are easy to implement and highly practicable, and provide high measurement accuracy.

Embodiment 4

Figure 5:
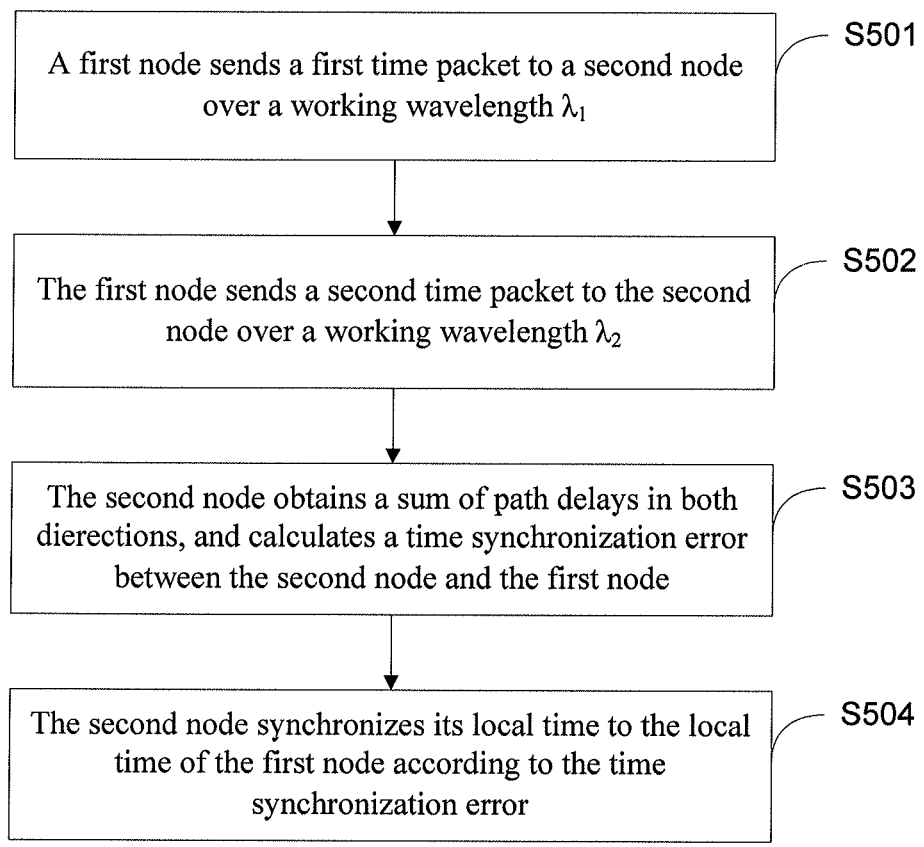
FIG. 5 is a flowchart of a time synchronization method according to a fourth embodiment of the present disclosure.

This embodiment provides a time synchronization method, which implements time synchronization between nodes combined with the 1588 protocol. The procedure of the method is shown in FIG. 5, in which the first node is a master node, and the second node is a slave node. The method includes the following steps:

Step S501: A first node sends a first time packet to a second node over a working wavelength $\lambda_1$.

In this embodiment, at the local time $t_{11}$, the first node sends the first time packet to the second node on the working wavelength $\lambda_1$, where the first time packet carries the sending time $t_{11}$ of the packet; the second node receives the first time packet at the local time $t_{12}$, and extracts the sending time $t_{11}$ of the first time packet carried in the first time packet.

A signal transmission rate corresponding to a working wavelength is definite. If the transmission rate of a signal over the working wavelength $\lambda_1$ on the line is $v_1$, it follows that:

$$t_{12} - t_{11} = \frac{L_{1-2}}{v_1} + \text{Offset} \quad (1)$$

Step S502: The first node sends a second time packet to the second node over a working wavelength $\lambda_2$.

In this embodiment, at the local time $t_{21}$, the first node sends the second time packet to the second node on the working wavelength $\lambda_2$, where the second time packet carries the sending time $t_{21}$ of the packet; the second node receives the second time packet at the local time $t_{22}$, and extracts the sending time $t_{21}$ of the second time packet carried in the second time packet.

A signal transmission rate corresponding to a working wavelength is definite. If the transmission rate of a signal over the working wavelength $\lambda_2$ on the line is $v_2$, it follows that:

$$t_{22} - t_{21} = \frac{L_{1-2}}{v_2} + \text{Offset} \quad (2)$$

Step S503: The second node obtains a sum of path delays in both directions, and calculates a time synchronization error between the second node and the first node.

A prerequisite of the 1588 protocol is that the path delay in the receiving direction is the same as the path delay in the transmitting direction. Therefore, the unidirectional path delay and the absolute time deviation calculated according to the 1588 protocol are inaccurate. But a precise sum of the path delays in both directions can be calculated according to the 1588 protocol.

In this embodiment, the second node obtains a precise sum D of the path delays in both directions between the first node and the second node according to the 1588 protocol.

From formulas (1) and (2), it follows that the line distance $L_{1-2}$ from the first node to the second node is:

$$L_{1-2} = \frac{((t_{12} - t_{11})(t_{22} - t_{21})) \times v_1 \times v_2}{v_2 - v_1} \quad (4)$$

With the signal transmission rate $V_{1-2}$ of a wavelength used for transmitting the 1588 protocol packet from the first node to the second node, it follows that the path delay $d_{1-2}$ of transmitting the 1588 protocol packet from the first node to the second node is:

$$d_{1-2} = \frac{L_{1-2}}{V_{1-2}} = \frac{((t_{12} - t_{11}) - (t_{22} - t_{21})) \times v_1 \times v_2}{(v_2 - v_1) \times V_{1-2}} \quad (5)$$

Therefore, it follows that the time synchronization error $\Delta T$ between the second node and the first node is:

$$\begin{aligned}
\Delta T &= T2' - T2_{1588} \quad (6) \\
&= d_{1-2} - \frac{D}{2} \\
&= \frac{L_{1-2}}{V_{1-2}} - \frac{D}{2} \\
&= \frac{((t_{12} - t_{11}) - (t_{22} - t_{21})) \times v_1 \times v_2}{(v_2 - v_1) \times V_{1-2}} - \frac{D}{2}
\end{aligned}$$

The second node calculates the time synchronization error $\Delta T$ between the second node and the first node based on formula (6) according to: the sending time $t_{11}$ of the first time packet, the sending time $t_{21}$ of the second time packet, the receiving time $t_{12}$ of the first time packet, the receiving time $t_{22}$ of the second time packet, the first signal transmission rate $v_1$, the second signal transmission rate $v_2$, and the sum D of the path delays in both directions between the first node and the second node, where the sum is obtained through the 1588 protocol.

Step S504: The second node synchronizes its local time to the local time of the first node according to the time synchronization error.

The second node synchronizes the local time of the second node with the local time of the first node through the 1588 protocol. Because a prerequisite of the IEEE 1588 protocol is that the path delays in both directions are the same, the synchronization between the local time of the second node and the local time of the first node may be inaccurate.

In this embodiment, according to the calculated time synchronization error $\Delta T$, the second node corrects its local time synchronized through the 1588 protocol, and synchronizes its local time to the local time of the first node precisely.

The corrected local time of the second node is $T2'=T2_{1588}+\Delta T$. That is, the second node adds the time synchronization error $\Delta T$ to the second node's local time $T2_{1588}$ synchronized through the 1588 protocol to obtain the local time $T2'$ precisely synchronized to the local time of the first node.

Embodiment 5

Figure 6:
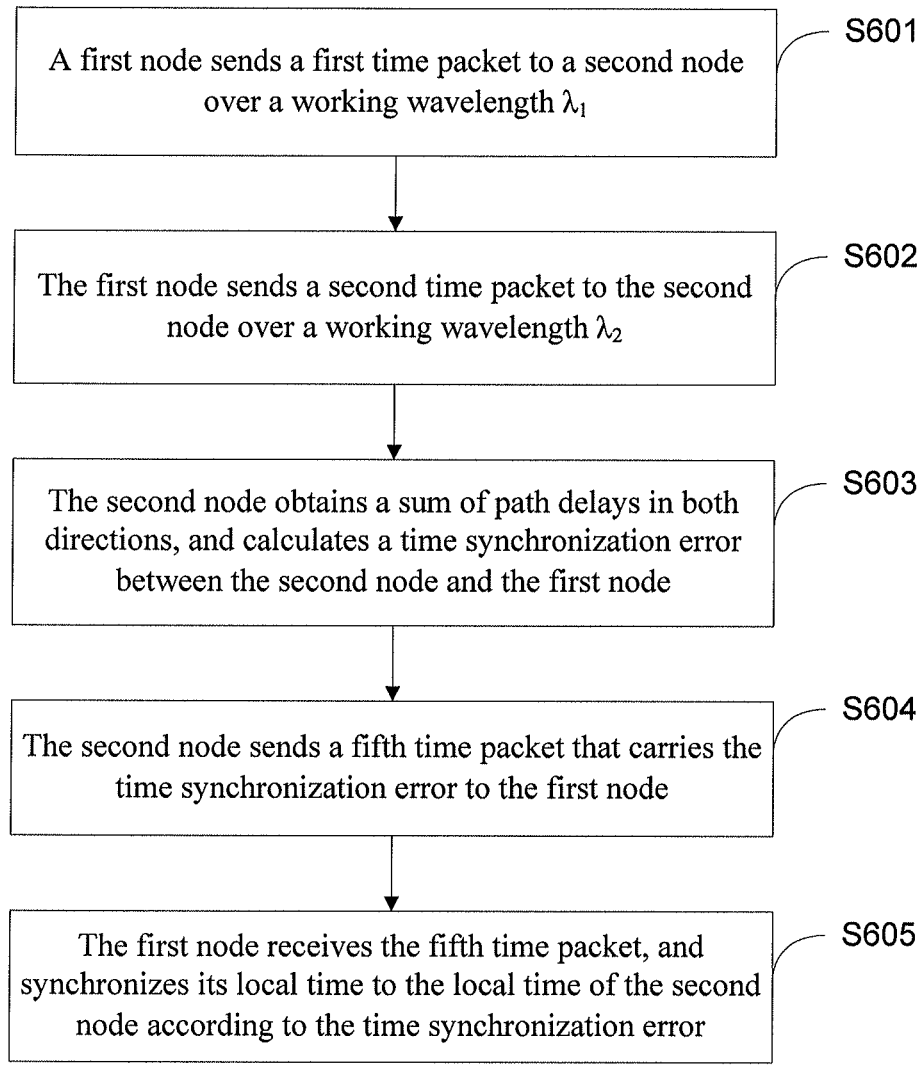
FIG. 6 is a flowchart of a time synchronization method according to a fifth embodiment of the present disclosure.

This embodiment provides a time synchronization method, which implements time synchronization between nodes combined with the 1588 protocol. The procedure of the method is shown in FIG. 6, in which the first node is a slave node, and the second node is a master node. The method includes the following steps:

Steps S601 and S602 in this embodiment are similar to steps S501 and S502 in embodiment 4 respectively, and are not repeated here any further.

Step S603: The second node obtains a sum of path delays in both directions, and calculates a time synchronization error between the second node and the first node.

In this embodiment, the second node obtains a precise sum D of the path delays in both directions between the first node and the second node through the 1588 protocol.

According to the sending time $t_{11}$ of the first time packet, the sending time $t_{21}$ of the second time packet, the receiving time $t_{12}$ of the first time packet, the receiving time $t_{22}$ of the second time packet, the first signal transmission rate $v_1$, the second signal transmission rate $v_2$, and the sum D of the path delays in both directions between the first node and the second node, where the sum is calculated through the 1588 protocol, the second node calculates the time synchronization error $\Delta T$ between the second node and the first node based on formula (6) in embodiment 4:

$$\Delta T = d_{1-2} - \frac{D}{2}$$
$$= -\left(d_{2-1} - \frac{D}{2}\right)$$
$$= -(T1' - T1_{1588})$$
$$= \frac{((t_{12} - t_{11}) - (t_{22} - t_{21})) \times v_1 \times v_2}{(v_2 - v_1) \times V_{1-2}} - \frac{D}{2'}$$

Step S604: The second node sends a fifth time packet that carries the time synchronization error to the first node.

In this embodiment, the second node sends the fifth time packet to the first node, where the fifth time packet carries the time synchronization error $\Delta T$ between the second node and the first node, and the time synchronization error is calculated by the second node. This embodiment does not restrict the format of the fifth time packet or the type of working wavelength that bears the packet.

Step S605: The first node receives the fifth time packet, and synchronizes its local time to the local time of the second node according to the time synchronization error.

The first node synchronizes the local time of the second node with the local time of the first node through the 1588 protocol. Because a prerequisite of the 1588 protocol is that the path delays in both directions are the same, the synchronization between the local time of the first node and the local time of the second node may be inaccurate.

In this embodiment, the first node receives the fifth time packet sent by the second node, and extracts the time synchronization error $\Delta T$ carried in the fifth time packet; and, according to the time synchronization error, corrects the first node's local time synchronized through the 1588 protocol, and synchronizes the local time of the first node to the local time of the second node precisely.

The corrected local time of the first node is $T1'=T1_{1588}-\Delta T$. That is, the first node subtracts the time synchronization error $\Delta T$ from the first node's local time $T1_{1588}$ synchronized through the 1588 protocol to obtain the local time $T1'$ precisely synchronized to the local time of the second node.

Sixth Embodiment

Figure 7:
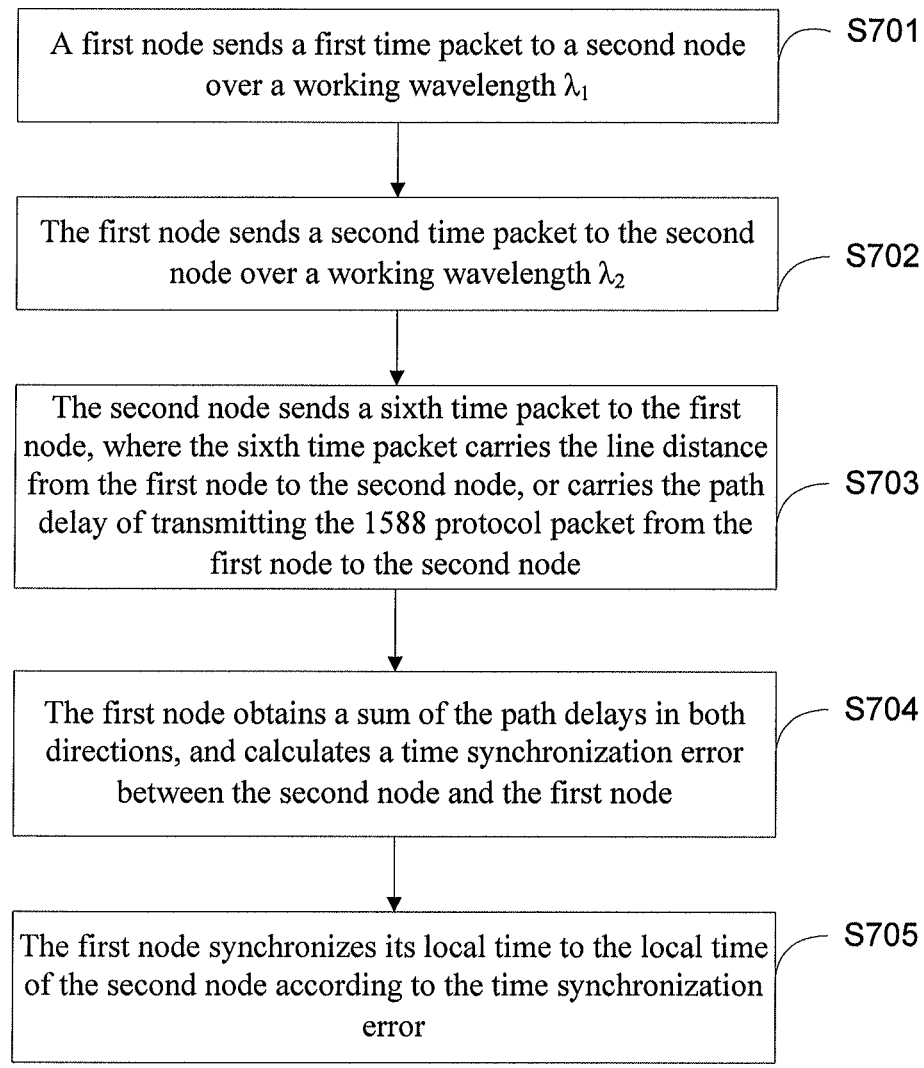
FIG. 7 is a flowchart of a time synchronization method according to a sixth embodiment of the present disclosure.

This embodiment provides a time synchronization method, which implements time synchronization between nodes combined with the 1588 protocol. The procedure of the method is shown in FIG. 7, in which the first node is a slave node, and the second node is a master node. The method includes the following steps:

Steps S701 and S702 in this embodiment are similar to steps S501 and S502 in embodiment 4 respectively, and are not repeated here any further.

Step S703: The second node sends a sixth time packet to the first node, where the sixth time packet carries the line distance from the first node to the second node, or carries the path delay of transmitting the 1588 protocol packet from the first node to the second node. In this embodiment, the second node sends the sixth time packet to the first node, where the sixth time packet carries the line distance $L_{1-2}$ from the first node to the second node, or carries the path delay $d_{1-2}$ of transmitting the 1588 protocol packet from the first node to the second node, where the line distance or path delay is calculated by the second node. This embodiment does not restrict the format of the sixth time packet or the type of working wavelength that bears the packet.

The second node may calculate the line distance $L_{1-2}$ from the first node to the second node based on formula (4) in embodiment 4 according to the receiving time $t_{12}$ of the first time packet, the receiving time $t_{22}$ of the second time packet, the sending time $t_{11}$ of the first time packet, the sending time $t_{21}$ of the second time packet, the first signal transmission rate $v_1$, and the second signal transmission rate $v_2$:

$$L_{1-2} = \frac{((t_{12} - t_{11}) - (t_{22} - t_{21})) \times v_1 \times v_2}{v_2 - v_1} \quad (4)$$

Alternatively, the second node may calculate the path delay $d_{1-2}$ from the first node to the second node based on formula (5) in embodiment 4 according to the receiving time $t_{12}$ of the first time packet, the receiving time $t_{22}$ of the second time packet, the sending time $t_{11}$ of the first time packet, the sending time $t_{21}$ of the second time packet, the first signal transmission rate $v_1$, the second signal transmission rate $v_2$, and the signal transmission rate $V_{1-2}$ used for transmitting the 1588 protocol packet from the first node to the second node:

$$d_{1-2} = \frac{L_{1-2}}{V_{1-2}} \quad (5)$$

$$= \frac{((t_{12} - t_{11}) - (t_{22} - t_{21})) \times v_1 \times v_2}{(v_2 - v_1) \times V_{1-2}}$$

Step S704: The first node obtains a sum of the path delays in both directions, and calculates a time synchronization error between the second node and the first node.

In this embodiment, the second node obtains a precise sum D of the path delays in both directions between the first node and the second node through the 1588 protocol.

The first node receives the sixth time packet sent by the second node, whereupon:

The first node extracts the line distance $L_{1-2}$ from the first node to the second node carried in the sixth time packet, and calculates the time synchronization error $\Delta T$ between the second node and the first node based on formula (6) in embodiment 4 according to the line distance $L_{1-2}$ from the first node to the second node, the signal transmission rate $V_{1-2}$ used for transmitting the 1588 protocol packet from the first node to the second node and the sum D of the path delays in both directions between the first node and the second node, where the sum is obtained through the 1588 protocol.

$$\Delta T = d_{1-2} - \frac{D}{2}$$

$$= -\left(d_{2-1} - \frac{D}{2}\right)$$

$$= -(T1' - T1_{1588})$$

$$= \frac{L_{1-2}}{V_{1-2}} - \frac{D}{2}.$$

Alternatively, the first node extracts the path delay $d_{1-2}$ of the 1588 protocol packet from the first node to the second node carried in the sixth time packet, and calculates the time synchronization error $\Delta T$ between the second node and the first node based on formula (6) in embodiment 4 according to the path delay $d_{1-2}$ of the 1588 protocol packet from the first node to the second node and the sum D of the path delay in both directions between the first node and the second node, where the sum is obtained through the 1588 protocol:

$$\Delta T = d_{1-2} - \frac{D}{2}$$

$$= -\left(d_{2-1} - \frac{D}{2}\right)$$

$$= -(T1' - T1_{1588}).$$

Step S705: The first node synchronizes its local time to the local time of the second node according to the time synchronization error.

In this embodiment, according to the time synchronization error, the first node corrects its local time synchronized through the 1588 protocol, and synchronizes its local time to the local time of the second node precisely.

The corrected local time of the first node is $T1'=T1_{1588}-\Delta T$. That is, the first node subtracts the time synchronization error $\Delta T$ from the first node's local time $T1_{1588}$ synchronized through the 1588 protocol to obtain the local time $T1'$ precisely synchronized to the local time of the second node.

Embodiment 7

Figure 8:
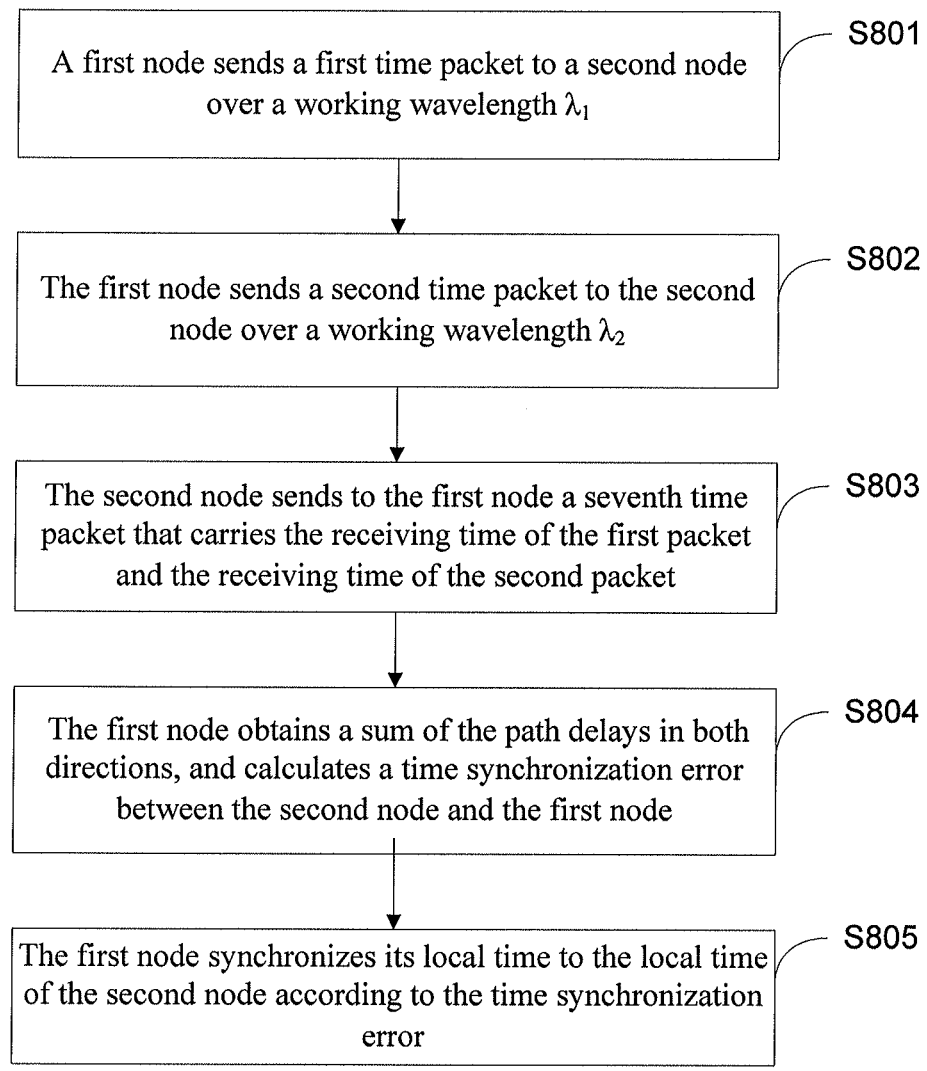
FIG. 8 is a flowchart of a time synchronization method according to a seventh embodiment of the present disclosure.

This embodiment provides a time synchronization method, which implements time synchronization between nodes combined with the 1588 protocol. The procedure of the method is shown in FIG. 8, in which the first node is a slave node, and the second node is a master node. The method includes the following steps:

Step S801: A first node sends a first time packet to a second node over a signal wavelength $\lambda_1$.

In this embodiment, the first node sends the first time packet to the second node at the local time $t_{11}$ over the signal wavelength $\lambda_1$, and the second node receives the first time packet at the local time $t_{12}$.

A signal transmission rate corresponding to a working wavelength is definite, and a transmission rate of a signal over the working wavelength $\lambda_1$ on the line is $v_1$.

Step S802: The first node sends a second time packet to the second node over a signal wavelength $\lambda_2$.

In this embodiment, the first node sends the second time packet to the second node at the local time $t_{21}$ over the signal wavelength $\lambda_2$, and the second node receives the second time packet at the local time $t_{22}$.

A signal transmission rate corresponding to a working wavelength is definite, and a transmission rate of a signal over the working wavelength $\lambda_2$ on the line is $v_2$.

Step S803: The second node sends to the first node a seventh time packet that carries the receiving time of the first packet and the receiving time of the second packet.

In this embodiment, the second node sends the seventh time packet to the first node, where the seventh time packet carries the receiving time $t_{12}$ of the first time packet at the second node and the receiving time $t_{22}$ of the second time packet at the second node. This embodiment does not restrict the format of the seventh time packet or the type of working wavelength that bears the packet.

Step S804: The first node obtains a sum of the path delays in both directions, and calculates a time synchronization error between the second node and the first node.

In this embodiment, the second node obtains a precise sum D of the path delays in both directions between the first node and the second node through the 1588 protocol.

The first node receives the seventh time packet sent by the second node, extracts the receiving time $t_{12}$ of the first time packet and the receiving time $t_{22}$ of the second time packet carried in the seventh time packet, and calculates the time synchronization error $\Delta T$ between the second node and the first node based on formula (6) in embodiment 4 according to the receiving time $t_{12}$ of the first time packet, the receiving time $t_{22}$ of the second time packet, the sending time $t_{11}$ of the first time packet, the sending time $t_{21}$ of the second time packet, the first signal transmission rate $v_1$, the second signal transmission rate $v_2$, the signal transmission rate $V_{1-2}$ of the wavelength used for transmitting the 1588 protocol packet from the first node to the second node, and the sum D of the path delays in both directions between the first node and the second node, where the sum is obtained through the 1588 protocol:

$$\Delta T = d_{1-2} - \frac{D}{2}$$

$$= -\left(d_{2-1} - \frac{D}{2}\right)$$

$$= -(T1' - T1_{1588})$$

$$= \frac{L_{1-2}}{V_{1-2}} - \frac{D}{2}$$

$$= \frac{((t_{12} - t_{11}) - (t_{22} - t_{21})) \times v_1 \times v_2}{(v_2 - v_1) \times V_{1-2}} - \frac{D}{2}.$$

Step S805: The first node synchronizes its local time to the local time of the second node according to the time synchronization error.

Step S805 in this embodiment is similar to step S705 in embodiment 6, and is not repeated here any further.

The detailed implementation process of the 1588 protocol mentioned in embodiments 4, 5, 6, and 7 conforms to the existing 1588 protocol, and is not repeated herein.

The solutions provided in embodiments 4, 5, 6, and 7 above implement automatic real-time measurement of the 1588 time synchronization error by sending time packets over at least two wavelengths of a unidirectional path, correct the local time synchronized through the 1588 protocol, accomplish precision time synchronization between nodes, solve the problem of time synchronization errors caused by the difference between the path delays in both directions in the prior art, and avoid the trouble of measuring and setting the time synchronization error manually in the process of deploying the time synchronization network. The solutions are easy to implement and highly practicable, and provide high measurement accuracy.

Other embodiments than embodiments 4, 5, 6, and 7 may exist. For example, the first node is a master node, the second node is a slave node, the first node sends the first time packet and the second time packet to the second node at a signal wavelength $\lambda_1$ and a signal wavelength $\lambda_2$ respectively; the first node obtains a sum D of the path delays in both directions between the first node and the second node, and sends the sum D to the second node through a time packet; the second node calculates the time synchronization error $\Delta T$ between the second node and the first node; according to the time synchronization error, the second node corrects its local time synchronized through the 1588 protocol to obtain a local time precisely synchronized to the local time of the first node. As another example, the first node is a slave node, the second node is a master node, the first node sends the first time packet and the second time packet to the second node at a signal wavelength $\lambda_1$ and a signal wavelength $\lambda_2$ respectively; the second node obtains a sum D of the path delays in both directions between the first node and the second node, and sends the sum D to the first node through a time packet; the first node calculates the time synchronization error $\Delta T$ between the second node and the first node; according to the time synchronization error, the first node corrects its local time synchronized through the 1588 protocol to obtain a local time precisely synchronized to the local time of the second node.

The two examples given above and all other embodiments, which can be derived by persons skilled in the art without any creative effort, shall fall within the protection scope of the present disclosure.

Embodiment 8

Figure 9:
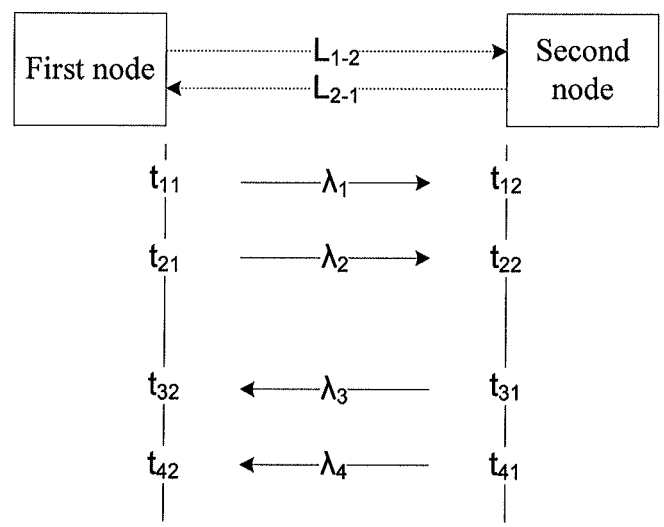
FIG. 9 is a schematic diagram of node relationships according to an eighth embodiment and a ninth embodiment of the present disclosure.
Figure 10:
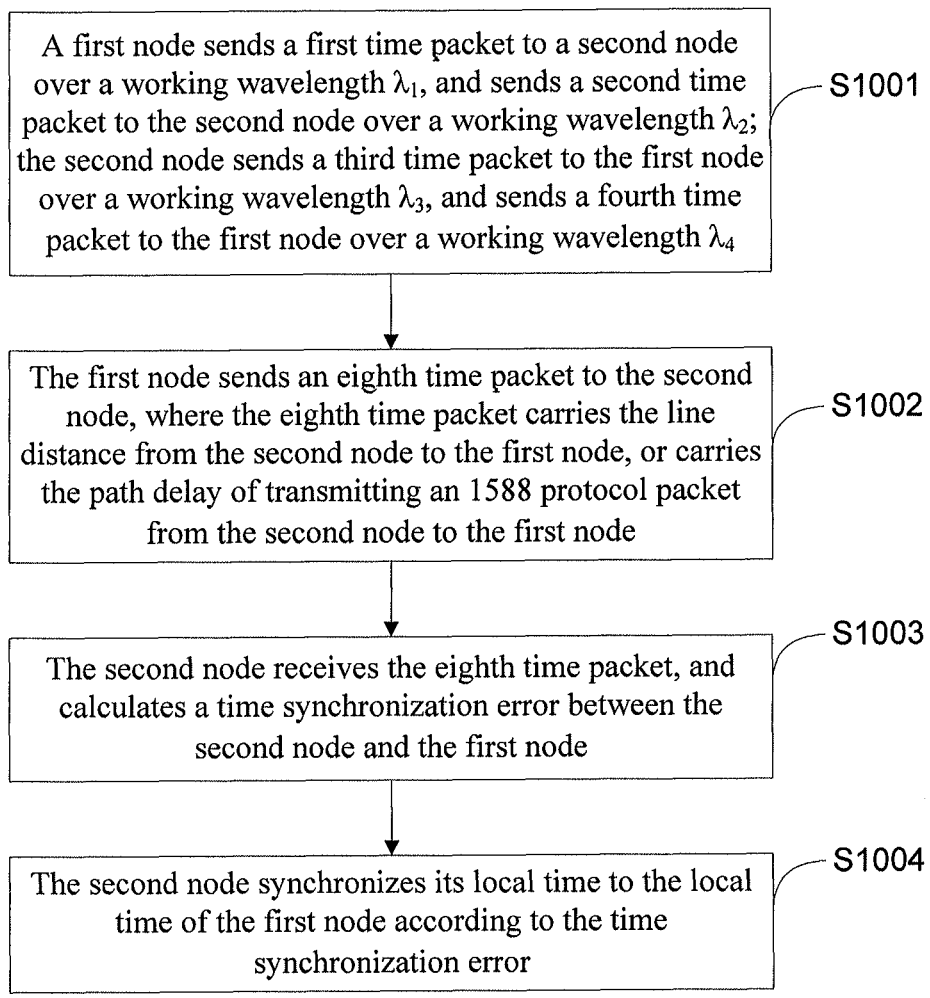
FIG. 10 is a flowchart of a time synchronization method according to an eighth embodiment of the present disclosure.

This embodiment provides a time synchronization method, which implements time synchronization between nodes combined with the 1588 protocol. The procedure of the method is shown in FIG. 10. With reference to FIG. 9, the first node is a master node, and the second node is a slave node. The method includes the following steps:

Step S1001: A first node sends a first time packet to a second node over a working wavelength $\lambda_1$, and sends a second time packet to the second node over a working wavelength $\lambda_2$; the second node sends a third time packet to the first node over a working wavelength $\lambda_3$, and sends a fourth time packet to the first node over a working wavelength $\lambda_4$.

In this embodiment, at the local time $t_{11}$, the first node sends the first time packet to the second node on the working wavelength $\lambda_1$, where the first time packet carries the sending time $t_{11}$ of the packet; the second node receives the first time packet at the local time $t_{12}$, and extracts the sending time $t_{11}$ of the first time packet carried in the first time packet.

At the local time $t_{21}$, the first node sends the second time packet to the second node on the working wavelength $\lambda_2$, where the second time packet carries the sending time $t_{21}$ of the packet; the second node receives the second time packet at the local time $t_{22}$, and extracts the sending time $t_{21}$ of the second time packet carried in the second time packet.

At the local time $t_{31}$, the second node sends the third time packet to the first node on the working wavelength $\lambda_3$, where the third time packet carries the sending time $t_{31}$ of the packet; the first node receives the third time packet at the local time $t_{32}$, and extracts the sending time $t_{31}$ of the third time packet carried in the third time packet.

At the local time $t_{41}$, the second node sends the fourth time packet to the first node on the working wavelength $\lambda_4$, where the fourth time packet carries the sending time $t_{41}$ of the packet; the first node receives the fourth time packet at the local time $t_{42}$, and extracts the sending time $t_{41}$ of the fourth time packet carried in the fourth time packet.

A signal transmission rate corresponding to a working wavelength is definite. If the transmission rate of a signal over the working wavelength $\lambda_1$ on the line is $v_1$, the transmission rate of a signal over the working wavelength $\lambda_2$ on the line is $v_2$, the transmission rate of a signal over the working wavelength $\lambda_3$ on the line is $v_3$, and the transmission rate of a signal over the working wavelength $\lambda_4$ on the line is $v_4$, it follows that:

$$t_{32} - t_{31} = \frac{L_{2-1}}{v_3} - \text{Offset} \quad (7)$$

$$t_{42} - t_{41} = \frac{L_{2-1}}{v_4} - \text{Offset} \quad (8)$$

Step S1002: The first node sends an eighth time packet to the second node, where the eighth time packet carries the line distance from the second node to the first node, or carries the path delay of transmitting an 1588 protocol packet from the second node to the first node.

In this embodiment, the first node sends the eighth time packet to the second node, where the eighth time packet carries the line distance $L_{2-1}$ from the second node to the first node, or carries the path delay $d_{2-1}$ of transmitting the 1588 protocol packet from the first node to the second node, where the line distance or path delay is calculated by the first node. This embodiment does not restrict the format of the eighth time packet or the type of working wavelength that bears the packet.

The first node may calculate the line distance $L_{2-1}$ from the second node to the first node based on formulas (7) and (8) according to the sending time $t_{31}$ of the third time packet, the sending time $t_{41}$ of the fourth time packet, the receiving time $t_{32}$ of the third time packet, the receiving time $t_{42}$ of the fourth time packet, the third signal transmission rate $v_3$, and the fourth signal transmission rate $v_4$:

$$L_{2-1} = \frac{((t_{32} - t_{31}) - (t_{42} - t_{41})) \times v_3 \times v_4}{v_4 - v_3} \quad (9)$$

The first node may calculate the path delay $d_{2-1}$ of the 1588 protocol packet from the first node to the second node based on formula (9) according to the sending time $t_{31}$ of the third time packet, the sending time $t_{41}$ of the fourth time packet, the receiving time $t_{32}$ of the third time packet, the receiving time $t_{42}$ of the fourth time packet, the third signal transmission rate $v_3$, the fourth signal transmission rate $v_4$, and the signal transmission rate $V_{2-1}$ of the wavelength used for transmitting the 1588 protocol packet from the second node to the first node:

$$d_{2-1} = \frac{L_{2-1}}{V_{2-1}} \quad (10)$$
$$= \frac{((t_{32} - t_{31}) - (t_{42} - t_{41})) \times v_3 \times v_4}{(v_4 - v_3) \times V_{2-1}}$$

Step S1003: The second node receives the eighth time packet, and calculates a time synchronization error between the second node and the first node.

In this embodiment, the second node receives the eighth time packet sent by the first node, whereupon:

The second node extracts the line distance $L_{2-1}$ from the second node to the first node carried in the eighth time packet, and calculates the time synchronization error $\Delta T$ between the second node and the first node based on formula (4) in embodiment 4 according to the line distance $L_{2-1}$ from the second node to the first node, the receiving time $t_{12}$ of the first time packet, the receiving time $t_{22}$ of the second time packet, the sending time $t_{11}$ of the first time packet, the sending time $t_{21}$ of the second time packet, the first signal transmission rate $v_1$, the second signal transmission rate $v_2$, the signal transmission rate $V_{1-2}$ of the wavelength used for transmitting the 1588 protocol packet from the first node to the second node, and the signal transmission rate $V_{2-1}$ of the wavelength used for transmitting the 1588 protocol packet from the second node to the first node:

$$\Delta T = T2' - T2_{1588} \quad (11)$$
$$= d_{1-2} - \frac{D}{2}$$
$$= \frac{d_{1-2} - d_{2-1}}{2}$$
$$= \frac{L_{1-2}}{2 \times V_{1-2}} - \frac{L_{2-1}}{2 \times V_{2-1}}$$
$$= \frac{((t_{12} - t_{11}) - (t_{22} - t_{21})) \times v_1 \times v_2}{2 \times (v_2 - v_1) \times V_{1-2}} - \frac{L_{2-1}}{2 \times V_{2-1}}$$

Alternatively, the second node extracts the path delay $d_{2-1}$ of the 1588 protocol packet from the second node to the first node carried in the eighth time packet, and calculates the time synchronization error $\Delta T$ between the second node and the first node based on formula (4) in embodiment 4 according to the path delay $d_{2-1}$ of the 1588 protocol packet from the second node to the first node, the receiving time $t_{12}$ of the first time packet, the receiving time $t_{22}$ of the second time packet, the sending time $t_{11}$ of the first time packet, the sending time $t_{21}$ of the second time packet, the first signal transmission rate $v_1$, the second signal transmission rate $v_2$ and the signal transmission rate $V_{1-2}$ of the wavelength used for transmitting the 1588 protocol packet from the first node to the second node:

$$\Delta T = T2' - T2_{1588} \quad (12)$$
$$= d_{1-2} - \frac{D}{2}$$
$$= \frac{d_{1-2} - d_{2-1}}{2}$$
$$= \frac{L_{1-2}}{2 \times V_{1-2}} - \frac{d_{2-1}}{2}$$
$$= \frac{((t_{12} - t_{11}) - (t_{22} - t_{21})) \times v_1 \times v_2}{2 \times (v_2 - v_1) \times V_{1-2}} - \frac{d_{2-1}}{2}$$

Step S1004: The second node synchronizes its local time to the local time of the first node according to the time synchronization error.

In this embodiment, according to the time synchronization error, the second node corrects its local time synchronized through the 1588 protocol, and synchronizes its local time to the local time of the first node precisely.

The corrected local time of the second node is $T2'-T2_{1588}+\Delta T$. That is, the second node adds the time synchronization error $\Delta T$ to the second node's local time $T2_{1588}$ synchronized through the 1588 protocol to obtain the local time $T2'$ precisely synchronized to the local time of the first node.

Embodiment 9

Figure 11:
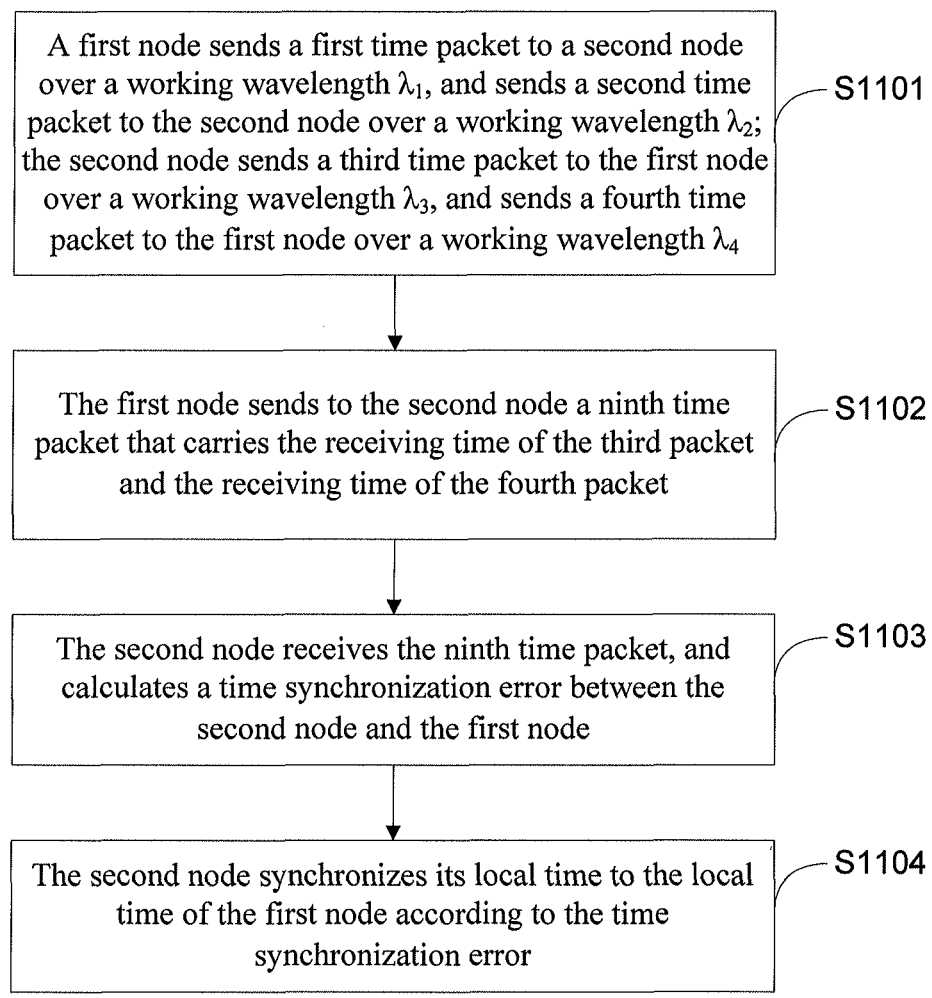
FIG. 11 is a flowchart of a time synchronization method according to a ninth embodiment of the present disclosure.

This embodiment provides a time synchronization method, which implements time synchronization between nodes combined with the 1588 protocol. The procedure of the method is shown in FIG. 11. With reference to FIG. 9, the first node is a master node, and the second node is a slave node. The method includes the following steps:

Step S1101: A first node sends a first time packet to a second node over a working wavelength $\lambda_1$, and sends a second time packet to the second node over a working wavelength $\lambda_2$; the second node sends a third time packet to the first node over a working wavelength $\lambda_3$, and sends a fourth time packet to the first node over a working wavelength $\lambda_4$.

In this embodiment, at the local time $t_{11}$, the first node sends the first time packet to the second node on the working wavelength $\lambda_1$, where the first time packet carries the sending time $t_{11}$ of the packet; the second node receives the first time packet at the local time $t_{12}$, and extracts the sending time $t_{11}$ of the first time packet carried in the first time packet.

At the local time $t_{21}$, the first node sends the second time packet to the second node on the working wavelength $\lambda_2$, where the second time packet carries the sending time $t_{21}$ of the packet; the second node receives the second time packet at the local time $t_{22}$, and extracts the sending time $t_{21}$ of the second time packet carried in the second time packet.

The second node sends the third time packet to the first node at the local time $t_{31}$ over the working wavelength $\lambda_3$, and the first node receives the third time packet at the local time $t_{32}$.

The second node sends the fourth time packet to the first node at the local time $t_{41}$ over the working wavelength $\lambda_4$, and the first node receives the fourth time packet at the local time $t_{42}$.

A signal transmission rate corresponding to a working wavelength is definite. The transmission rate of a signal over the working wavelength $\lambda_1$ on the line is $v_1$, the transmission rate of a signal over the working wavelength $\lambda_2$ on the line is $v_2$, the transmission rate of a signal over the working wavelength $\lambda_3$ on the line is $v_3$, and the transmission rate of a signal over the working wavelength $\lambda_4$ on the line is $v_4$.

Step S1102: The first node sends to the second node a ninth time packet that carries the receiving time of the third time packet and the receiving time of the fourth time packet.

In this embodiment, the first node sends the ninth time packet to the second node, where the ninth time packet carries the receiving time $t_{32}$ of the third time packet at the first node and the receiving time $t_{42}$ of the fourth time packet at the first node.

Step S1103: The second node receives the ninth time packet, and calculates a time synchronization error between the second node and the first node.

In this embodiment, the second node receives the ninth time packet sent by the first node, extracts the receiving time $t_{32}$ of the third time packet and the receiving time $t_{42}$ of the fourth time packet carried in the ninth time packet, and calculates the time synchronization error $\Delta T$ between the second node and the first node based on formula (4) in embodiment 4 and formula (9) in embodiment 8 according to the receiving time $t_{32}$ of the third time packet, the receiving time $t_{42}$ of the fourth time packet, the receiving time $t_{12}$ of the first time packet, the receiving time $t_{22}$ of the second time packet, the sending time $t_{11}$ of the first time packet, the sending time $t_{21}$ of the second time packet, the sending time $t_{31}$ of the third time packet, the sending time $t_{41}$ of the fourth time packet, the first signal transmission rate $v_1$, the second signal transmission rate $v_2$, the third signal transmission rate $v_3$, the fourth signal transmission rate $v_4$, the signal transmission rate $V_{1-2}$ of the wavelength used for transmitting the 1588 protocol packet from the first node to the second node, and the signal transmission rate $V_{2-1}$ of the wavelength used for transmitting the 1588 protocol packet from the second node to the first node:

$$\Delta T = T2' - T2_{1588} \tag{13}$$
$$= d_{1-2} - \frac{D}{2}$$
$$= \frac{d_{1-2} - d_{2-1}}{2}$$
$$= \frac{L_{1-2}}{2 \times V_{1-2}} - \frac{L_{2-1}}{2 \times V_{2-1}}$$
$$= \frac{((t_{12} - t_{11}) - (t_{22} - t_{21})) \times v_1 \times v_2}{2 \times (v_2 - v_1) \times V_{1-2}} -$$
$$\frac{((t_{32} - t_{31}) - (t_{42} - t_{41})) \times v_3 \times v_4}{2 \times (v_4 - v_3) \times V_{2-1}}$$

Step S1104: The second node synchronizes its local time to the local time of the first node according to the time synchronization error.

Step S1104 in this embodiment is similar to step S1004 in embodiment 8, and is not repeated here any further.

The detailed implementation process of the 1588 protocol mentioned in embodiments 8 and 9 conforms to the existing 1588 protocol, and is not repeated herein.

The solutions provided in embodiments 8 and 9 above implement automatic real-time measurement of the 1588 time synchronization error by sending time packets over at least two wavelengths in each direction of a bidirectional path, correct the local time synchronized through the 1588 protocol, accomplish precision time synchronization between nodes, solve the problem of time synchronization errors caused by the difference between the path delays in both directions in the prior art, and avoid the trouble of measuring and setting the time synchronization error manually in the process of deploying the time synchronization network. The solutions are easy to implement and highly practicable, and provide high measurement accuracy.

Other embodiments than embodiments 8 and 9 may exist. For example, the first node is a master node, the second node is a slave node, the first node sends the first time packet and the second time packet to the second node at a working wavelength $\lambda_1$ and a working wavelength $\lambda_2$ respectively; the second node sends the third time packet and the fourth time packet to the first node at a working wavelength $\lambda_3$ and a working wavelength $\lambda_4$ respectively. Optionally, the first node calculates the time synchronization error $\Delta T$ between the second node and the first node and sends the time synchronization error to the second node through a time packet; according to the time synchronization error, the second node corrects its local time synchronized through the 1588 protocol to obtain a local time precisely synchronized to the local time of the first node. Still optionally, the second node calculates the line distance $L_{2-1}$ from the second node to the first node or the path delay $d_{2-1}$ of the 1588 protocol packet from the second node to the first node, and sends the line distance or path delay to the first node through a time packet; the first node calculates the time synchronization error $\Delta T$ between the second node and the first node, and sends the time synchronization error to the second node through a time packet; according to the time synchronization error, the second node corrects its local time synchronized through the 1588 protocol to obtain a local time precisely synchronized to the local time of the first node.

The two examples given above and all other embodiments, which can be derived by persons skilled in the art without any creative effort, shall fall within the protection scope of the present disclosure.

In embodiments 1-9 above, a wavelength tunable optical module may be used to adjust the working wavelength dynamically and send packets over different wavelengths on the line.

A delay coefficient of a wavelength signal in a unit length of fiber is K, and is a reciprocal of the transmission rate v of the wavelength signal in the fiber, namely, $$K = \frac{1}{v}.$$

Therefore, the reciprocal of the delay coefficient K in the unit length of fiber may replace the transmission rate v in embodiments 1-9 (including: transmission rate $v_1$ of the signal over the wavelength $\lambda_1$ on the line; transmission rate $v_2$ of the signal over the wavelength $\lambda_2$ on the line; transmission rate $v_3$ of the signal over the wavelength $\lambda_3$ on the line; transmission rate $v_4$ of the signal over the wavelength $\lambda_4$ on the line; signal transmission rate $V_{1-2}$ of the wavelength used for transmitting the 1588 protocol packet from the first node to the second node; and signal transmission rate $V_{2-1}$ of the wavelength used for transmitting the 1588 protocol packet from the second node to the first node) to calculate the absolute time deviation or time synchronization error and implement precision time synchronization between nodes.

To obtain the absolute time deviation or time synchronization error between the master node and the slave node more precisely and reduce the measurement error, the line may work in a multi-wavelength mode for measurement in embodiments 1-9 to obtain multiple measurement results: $\text{Offset}_1, \text{Offset}_2, \text{Offset}_3, \ldots,$ and $\text{Offset}_n$, or $\Delta T_1, \Delta T_2, \Delta T_3,$ and $\Delta T_n$, whereupon a mean value of the n (n>1) results is calculated and the local time between nodes is synchronized according to the mean value.

Embodiment 10

Figure 12:
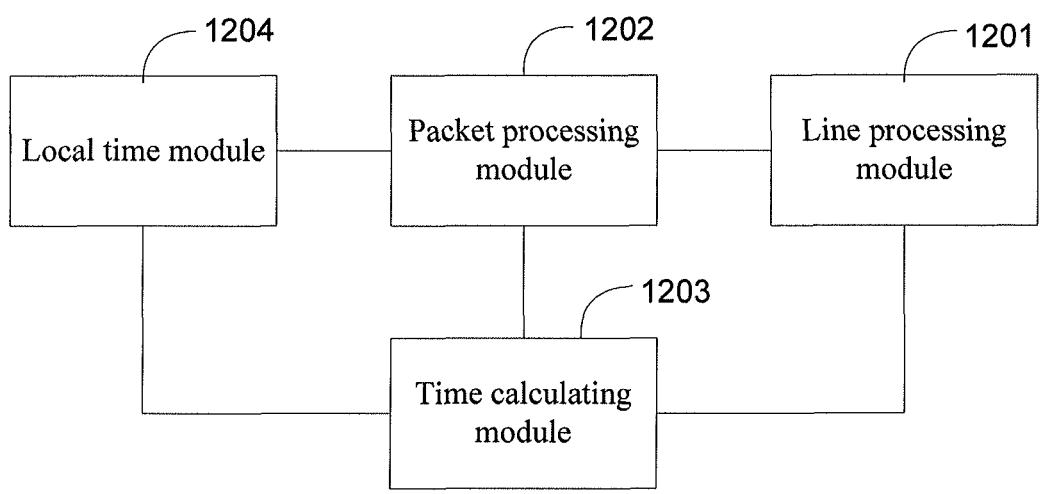
FIG. 12 is a structural block diagram of a node device according to a tenth embodiment and a twelfth embodiment of the present disclosure.

As shown in FIG. 12, a node device includes:

a line processing module 1201, configured to receive a first time packet sent by a first node at a first working wavelength $\lambda_1$, and a second time packet sent by the first node at a second working wavelength $\lambda_2$;

a packet processing module 1202, configured to: record receiving time $t_{12}$ of the first time packet and receiving time $t_{22}$ of the second time packet;

resolve the first time packet and the second time packet, and extract sending time $t_{11}$ of the first time packet carried in the first time packet, and sending time $t_{21}$ of the second time packet carried in the second time packet;

a time calculating module 1203, configured to calculate an absolute time deviation Offset between the node device and the first node based on formula (3) below according to the sending time $t_{11}$ of the first time packet, the sending time $t_{21}$ of the second time packet, the receiving time $t_{12}$ of the first time packet, the receiving time $t_{22}$ of the second time packet, a first signal transmission rate $v_1$ corresponding to the first working wavelength, and a second signal transmission rate $v_2$ corresponding to the second working wavelength:

$$\text{Offset} = \frac{(t_{12} - t_{11}) \times v_1 - (t_{22} - t_{21}) \times v_2}{v_1 - v_2} \quad (3)$$

a local time module 1204, configured to: deliver the receiving time $t_{12}$ of the first time packet and the receiving time $t_{22}$ of the second time packet to the packet processing module 1202; and subtract the absolute time deviation from local time of the node device to obtain local time synchronized to local time of the first node, where the absolute time deviation is calculated by the time calculating module 1203.

Embodiment 11

Figure 13:
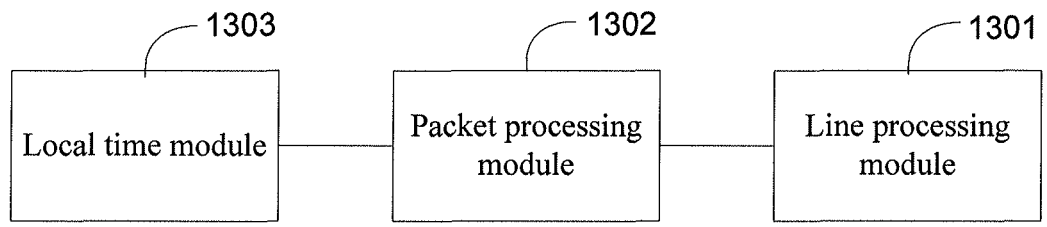
FIG. 13 is a structural block diagram of a node device according to an eleventh embodiment of the present disclosure.

As shown in FIG. 13, a node device includes:

a line processing module 1301, configured to: send a first time packet to a second node at a first working wavelength $\lambda_1$, and send a second time packet to the second node at a second working wavelength $\lambda_2$;

receive a third time packet sent by the second node;

a packet processing module 1302, configured to encapsulate the first time packet and the second time packet, where the first time packet carries sending time $t_{11}$ of the first time packet, and the second time packet carries sending time $t_{21}$ of the second time packet;

resolve the third time packet and extract an absolute time deviation Offset between the node device and the second node carried in the third time packet, where the absolute time deviation Offset is calculated by the second node based on formula (3) below according to the sending time $t_{11}$ of the first time packet, the sending time $t_{21}$ of the second time packet, receiving time $t_{12}$ of the first time packet, receiving time $t_{22}$ of the second time packet, a first signal transmission rate $v_1$ corresponding to the first working wavelength, and a second signal transmission rate $v_2$ corresponding to the second working wavelength:

$$\text{Offset} = \frac{(t_{12} - t_{11}) \times v_1 - (t_{22} - t_{21}) \times v_2}{v_1 - v_2} \quad (3)$$

a local time module 1303, configured to: deliver the sending time $t_{11}$ of the first time packet and the sending time $t_{21}$ of the second time packet to the packet processing module 1302; and add the absolute time deviation Offset extracted by the packet processing module 1302 to local time of the node device to obtain local time synchronized to local time of the second node.

Embodiment 12

As shown in FIG. 12, a node device includes:

a line processing module 1201, configured to: send a first time packet to a second node at a first working wavelength $\lambda_1$, and send a second time packet to the second node at a second working wavelength $\lambda_2$;

receive a fourth time packet sent by the second node;

a packet processing module 1202, configured to: encapsulate the first time packet and the second time packet, and record sending time $t_{11}$ of the first time packet and sending time $t_{21}$ of the second time packet;

resolve the fourth time packet and extract receiving time $t_{12}$ of the first time packet and receiving time $t_{22}$ of the second time packet carried in the fourth time packet;

a time calculating module 1203, configured to calculate an absolute time deviation Offset between the node device and the second node based on formula (3) below according to the sending time $t_{11}$ of the first time packet, the sending time $t_{21}$ of the second time packet, the receiving time $t_{12}$ of the first time packet, the receiving time $t_{22}$ of the second time packet, a first signal transmission rate $v_1$ corresponding to the first working wavelength, and a second signal transmission rate $v_2$ corresponding to the second working wavelength:

$$\text{Offset} = \frac{(t_{12} - t_{11}) \times v_1 - (t_{22} - t_{21}) \times v_2}{v_1 - v_2} \quad (3)$$

a local time module 1204, configured to: deliver the sending time $t_{11}$ of the first time packet and the sending time $t_{21}$ of the second time packet to the packet processing module 1202; add local time of the node device to the absolute time deviation Offset calculated by the time calculating module 1203 to obtain local time synchronized to local time of the second node.

Embodiment 13

Figure 14:
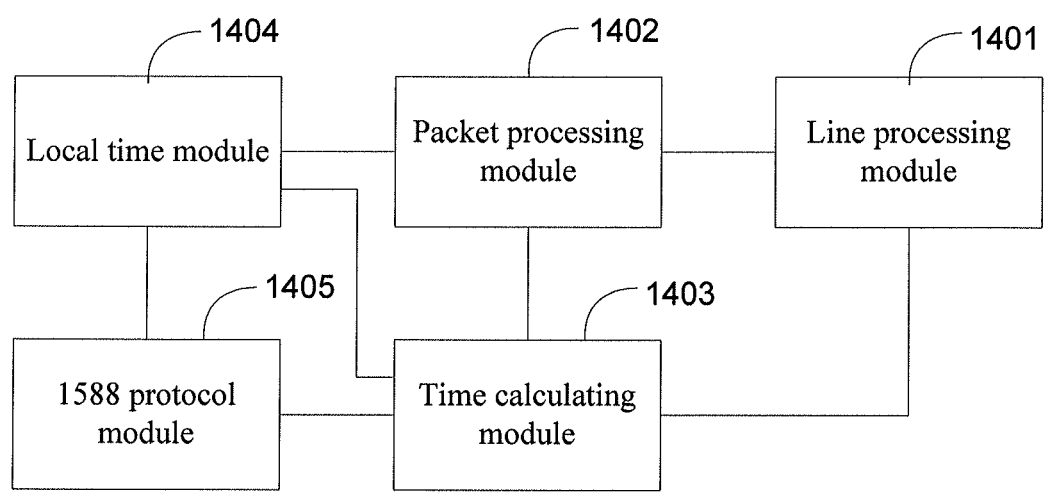
FIG. 14 is a structural block diagram of a node device according to a thirteenth embodiment of the present disclosure.

As shown in FIG. 14, a node device includes:

a line processing module 1401, configured to receive a first time packet sent by a first node at a first working wavelength $\lambda_1$, and a second time packet sent by the first node at a second working wavelength $\lambda_2$;

a packet processing module 1402, configured to: record receiving time $t_{12}$ of the first time packet and receiving time $t_{22}$ of the second time packet;

resolve the first time packet and the second time packet, and extract sending time $t_{11}$ of the first time packet carried in the first time packet, and sending time $t_{21}$ of the second time packet carried in the second time packet;

an 1588 protocol module 1405, configured to execute the 1588 protocol to obtain a sum D of path delays in both directions between the first node and the second node, and synchronize local time of the node device to local time of the first node through the 1588 protocol;

a time calculating module 1403, configured to: calculate a time synchronization error ΔT between the second node and the first node based on formula (6) in embodiment 4 according to the sending time $t_{11}$ of the first time packet, the sending time $t_{21}$ of the second time packet, the receiving time $t_{12}$ of the first time packet, the receiving time $t_{22}$ of the second time packet, a first signal transmission rate $v_1$ corresponding to the first working wavelength, a second signal transmission rate $v_2$ corresponding to the second working wavelength, a signal transmission rate $V_{1-2}$ used for transmitting an 1588 protocol packet from the first node to the second node, and the sum D of the path delays in both directions between the first node and the second node, where the sum D is obtained by the 1588 protocol module 1405:

$$\Delta T = d_{1-2} - \frac{D}{2}$$
$$= \frac{L_{1-2}}{V_{1-2}} - \frac{D}{2}$$
$$= \frac{((t_{12} - t_{11}) - (t_{22} - t_{21})) \times v_1 \times v_2}{(v_2 - v_1) \times V_{1-2}} - \frac{D}{2};$$

a local time module 1404, configured to: deliver the receiving time $t_{12}$ of the first time packet and the receiving time $t_{22}$ of the second time packet to the packet processing module 1402; deliver the local time to the 1588 protocol module 1405; add the node device's local time synchronized through the 1588 protocol to the time synchronization error ΔT calculated by the time calculating module 1403 to correct the local time synchronized through the 1588 protocol.

Embodiment 14

Figure 15:
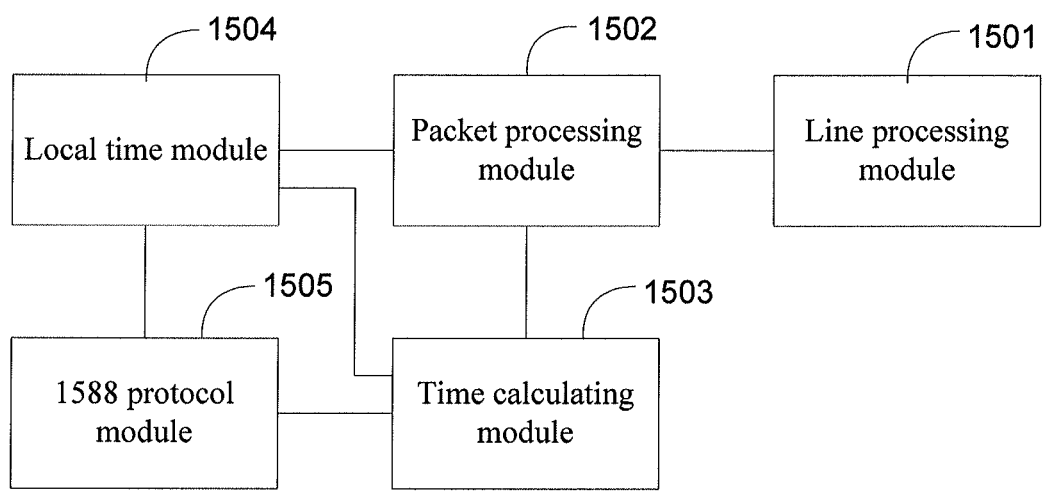
FIG. 15 is a structural block diagram of a node device according to a fourteenth embodiment of the present disclosure.

As shown in FIG. 15, a node device includes:

a line processing module 1501, configured to: send a first time packet to a second node at a first working wavelength $\lambda_1$, and send a second time packet to the second node at a second working wavelength $\lambda_2$;

receive a sixth time packet sent by the second node;

a packet processing module 1502, configured to: encapsulate the first time packet and the second time packet, where the first time packet carries sending time $t_{11}$ of the first time packet, and the second time packet carries sending time $t_{21}$ of the second time packet;

resolve the sixth time packet, and extract a line distance $L_{1-2}$ from the first node to the second node or extract a path delay $d_{1-2}$ of transmitting an 1588 protocol packet from the first node to the second node, where the line distance or the path delay is calculated by the second node and carried in the sixth time packet, the line distance $L_{1-2}$ from the first node to the second node is calculated by the second node based on formula (4) below according to the sending time $t_{11}$ of the first time packet, the sending time $t_{21}$ of the second time packet, receiving time $t_{12}$ of the first time packet, receiving time $t_{22}$ of the second time packet, a first signal transmission rate $v_1$ corresponding to the first working wavelength, and a second signal transmission rate $v_2$ corresponding to the second working wavelength;

$$L_{1-2} = \frac{((t_{12} - t_{11}) - (t_{22} - t_{21})) \times v_1 \times v_2}{v_2 - v_1} \quad (4)$$

the path delay $d_{1-2}$ of transmitting the 1588 protocol packet from the first node to the second node is calculated by the second node based on formula (5) below according to the sending time $t_{11}$ of the first time packet, the sending time $t_{21}$ of the second time packet, the receiving time $t_{12}$ of the first time packet, the receiving time $t_{22}$ of the second time packet, the first signal transmission rate $v_1$ corresponding to the first working wavelength, the second signal transmission rate $v_2$ corresponding to the second working wavelength, and the signal transmission rate $V_{1-2}$ used for transmitting the 1588 protocol packet from the first node to the second node:

$$d_{1\ 2} = \frac{L_{1-2}}{V_{1-2}} \quad (5)$$
$$= \frac{((t_{12} - t_{11}) - (t_{22} - t_{21})) \times v_1 \times v_2}{(v_2 - v_1) \times V_{1-2}}$$

an 1588 protocol module 1505, configured to: execute the 1588 protocol to obtain a sum D of the path delays in both directions between the first node and the second node; synchronize local time of the node device to local time of the second node through the 1588 protocol;

a time calculating module 1503, configured to: calculate a time synchronization error ΔT between the second node and the first node based on formula (6) in embodiment 4 according to the line distance $L_{1-2}$ from the first node to the second node, the signal transmission rate $V_{1-2}$ used for transmitting the 1588 protocol packet from the first node to the second node, and the sum D of the path delays in both directions between the first node and the second node, where the sum D is obtained by the 1588 protocol module:

$$\Delta T = d_{1-2} - \frac{D}{2}$$
$$= \frac{L_{1-2}}{V_{1-2}} - \frac{D}{2};$$

or configured to: calculate the time synchronization error ΔT between the second node and the first node based on formula (6) in embodiment 4 according to the path delay $d_{1-2}$ of the 1588 protocol packet from the first node to the second node and the sum D of the path delays in both directions between the first node and the second node, where the sum D is obtained by the 1588 protocol module 1505:

$$\Delta T = d_{1-2} - \frac{D}{2};$$

a local time module 1504, configured to: deliver the sending time $t_{11}$ of the first time packet and the sending time $t_{21}$ of the second time packet to the packet processing module 1502; deliver the local time to the 1588 protocol module 1505; subtract the time synchronization error ΔT calculated by the time calculating module from the node device's local time synchronized through the 1588 protocol to correct the local time synchronized through the 1588 protocol.

Embodiment 15

Figure 16:
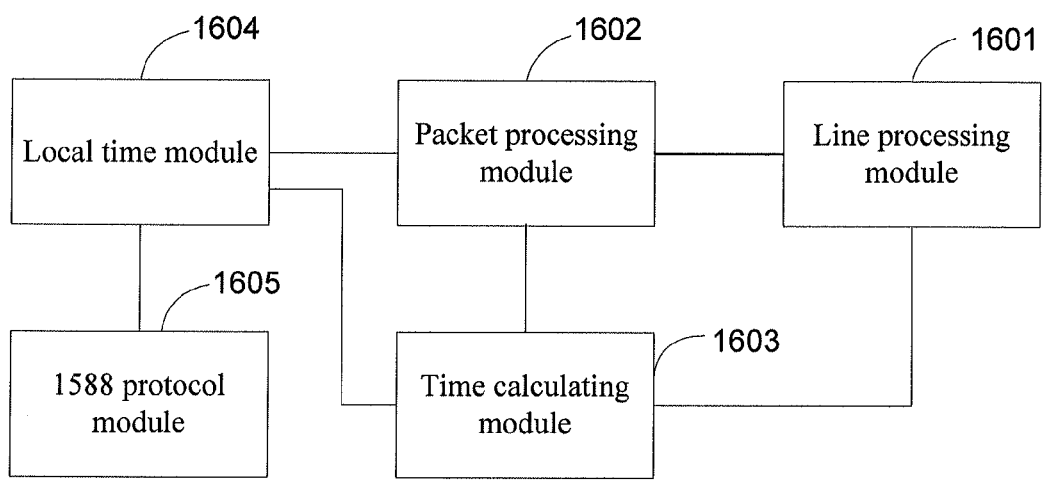
FIG. 16 is a structural block diagram of a node device according to a fifteenth embodiment of the present disclosure.

As shown in FIG. 16, a node device includes:

a line processing module 1601, configured to: receive a first time packet sent by a first node at a first working wavelength $\lambda_1$, and a second time packet sent by the first node at a second working wavelength $\lambda_2$;

send a third time packet to the first node at a third working wavelength $\lambda_3$, and send a fourth time packet to the first node at a fourth working wavelength $\lambda_4$;

receive an eighth time packet sent by the first node;

a packet processing module 1602, configured to: record receiving time $t_{12}$ of the first time packet and receiving time $t_{22}$ of the second time packet; resolve the first time packet and the second time packet, and extract sending time $t_{11}$ of the first time packet carried in the first time packet, and sending time $t_{21}$ of the second time packet carried in the second time packet;

encapsulate the third time packet and the fourth time packet, where the third time packet carries sending time $t_{31}$ of the third time packet, and the fourth time packet carries sending time $t_{41}$ of the fourth time packet;

resolve the eighth time packet, and extract a path delay $d_{2-1}$ of an 1588 protocol packet from the second node to the first node carried in the eighth time packet, where the path delay $d_{2-1}$ of the 1588 protocol packet from the second node to the first node is calculated by the first node based on formula (10) in embodiment 8 according to the sending time $t_{31}$ of the third time packet, the sending time $t_{41}$ of the fourth time packet, the receiving time $t_{32}$ of the third time packet, the receiving time $t_{42}$ of the fourth time packet, the third signal transmission rate $v_3$ corresponding to the third working wavelength, the fourth signal transmission rate $v_4$ corresponding to the fourth working wavelength, and the signal transmission rate $V_{2-1}$ used for transmitting the 1588 protocol packet from the second node to the first node:

$$d_{2-1} = \frac{L_{2-1}}{V_{2-1}} \quad (10)$$
$$= \frac{((t_{32} - t_{31}) - (t_{42} - t_{41})) \times v_3 \times v_4}{(v_4 - v_3) \times V_{2-1}}$$

an 1588 protocol module 1605, configured to execute the 1588 protocol, and synchronize local time of the node device to local time of the first node through the 1588 protocol; a time calculating module 1603, configured to: calculate a time synchronization error $\Delta T$ between the node device and the first node based on formula (12) in embodiment 8 according to the sending time $t_{11}$ of the first time packet, the sending time $t_{21}$ of the second time packet, the receiving time $t_{12}$ of the first time packet, the receiving time $t_{22}$ of the second time packet, a first signal transmission rate $v_1$ corresponding to the first working wavelength, a second signal transmission rate $v_2$ corresponding to the second working wavelength, the path delay $d_{2-1}$ of the 1588 protocol packet from the second node to the first node as calculated by the first node, and the signal transmission rate $V_{1-2}$ of wavelength used for transmitting the 1588 protocol packet from the first node to the second node:

$$\Delta T = T2' - T2_{1588} \quad (12)$$
$$= d_{1-2} - \frac{D}{2}$$
$$= \frac{d_{1-2} - d_{2-1}}{2} - \frac{L_{1-2}}{2 \times V_{1-2}} - \frac{d_{2-1}}{2}$$
$$= \frac{((t_{12} - t_{11}) - (t_{22} - t_{21})) \times v_1 \times v_2}{2 \times (v_2 - v_1) \times V_{1-2}} - \frac{d_{2-1}}{2}$$

a local time module 1604, configured to: deliver the receiving time $t_{12}$ of the first time packet, the receiving time $t_{22}$ of the second time packet, the sending time $t_{31}$ of the third time packet, and the sending time $t_{41}$ of the fourth time packet to the packet processing module 1602; deliver the local time to the 1588 protocol module 1605;

add the node device's local time synchronized through the 1588 protocol to the time synchronization error $\Delta T$ calculated by the time calculating module 1603 to correct the local time synchronized through the 1588 protocol.

Figure 17:
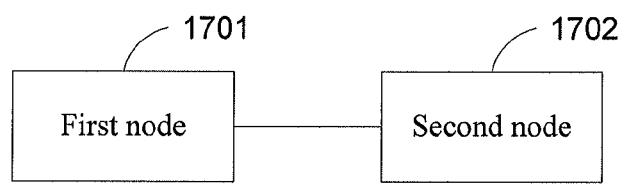
FIG. 17 is a schematic diagram of a time synchronization system according to a sixteenth embodiment, a seventeenth embodiment, an eighteenth embodiment, a nineteenth embodiment, a twentieth embodiment, and a twenty-first embodiment of the present disclosure.

The following describes a time synchronization system disclosed in an embodiment of the present disclosure with reference to FIG. 17. For brevity in the following embodiments, a first node device 1701 is briefly known as a first node 1701, and a second node device 1702 is briefly known as a second node 1702.

Embodiment 16

A time synchronization system includes at least two node devices, where:

a first node 1701 includes:

a line processing module, configured to: send a first time packet to a second node 1702 at a first working wavelength $\lambda_1$, and send a second time packet to the second node 1702 at a second working wavelength $\lambda_2$;

a packet processing module, configured to encapsulate the first time packet and the second time packet, where the first time packet carries sending time $t_{11}$ of the first time packet, and the second time packet carries sending time $t_{21}$ of the second time packet; and a local time module, configured to: deliver the sending time $t_{11}$ of the first time packet and the sending time $t_{21}$ of the second time packet to the packet processing module.

A second node 1702 includes: a line processing module, a packet processing module, a time calculating module, and a local time module. For details of such modules, see the line processing module 1201, packet processing module 1202, time calculating module 1203, and local time module 1204 described in embodiment 10.

Embodiment 17

A time synchronization system includes at least two node devices, where:

A first node 1701 includes: a line processing module, a packet processing module, and a local time module. For details of such modules, see the line processing module 1301, packet processing module 1302, and local time module 1303 described in embodiment 11.

A second node 1702 includes:

a line processing module 1201, configured to receive the first time packet sent by the first node 1701 at the first working wavelength $\lambda_1$ and the second time packet sent by the first node 1701 at the second working wavelength $\lambda_2$, and send the third time packet to the first node 1701;

a packet processing module, configured to: record receiving time $t_{12}$ of the first time packet and receiving time $t_{22}$ of the second time packet; resolve the first time packet and the second time packet, and extract sending time $t_{11}$ of the first time packet carried in the first time packet, and sending time $t_{21}$ of the second time packet carried in the second time packet, and encapsulate the third time packet, where the third time packet carries an absolute time deviation Offset;

a time calculating module, configured to calculate the absolute time deviation Offset between the second node 1702 and the first node 1701 based on formula (3) below according to the sending time $t_{11}$ of the first time packet, the sending time $t_{21}$ of the second time packet, the receiving time $t_{12}$ of the first time packet, the receiving time $t_{22}$ of the second time packet, the first signal transmission rate $v_1$ corresponding to the first working wavelength, and the second signal transmission rate $v_2$ corresponding to the second working wavelength:

$$\text{Offset} = \frac{(t_{12} - t_{11}) \times v_1 - (t_{22} - t_{21}) \times v_2}{v_1 - v_2} \quad (3)$$

a local time module, configured to: deliver the receiving time $t_{12}$ of the first time packet and the receiving time $t_{22}$ of the second time packet to the packet processing module.

Embodiment 18

A time synchronization system includes at least two node devices, where:

A first node 1701 includes: a line processing module, a packet processing module, a time calculating module, and a local time module. For details of such modules, see the line processing module 1201, packet processing module 1202, time calculating module 1203, and local time module 1204 described in embodiment 12.

A second node 1702 includes:

a line processing module 1201, configured to receive the first time packet sent by the first node 1701 at the first working wavelength $\lambda_1$ and the second time packet sent by the first node 1701 at the second working wavelength $\lambda_2$, and send the fourth time packet to the first node 1701;

a packet processing module, configured to encapsulate the fourth time packet, where the fourth time packet carries receiving time $t_{12}$ of the first time packet and receiving time $t_{22}$ of the second time packet; and a local time module, configured to: deliver the receiving time $t_{12}$ of the first time packet and the receiving time $t_{22}$ of the second time packet to the packet processing module.

Embodiment 19

A time synchronization system includes at least two node devices, where:

A first node 1701 includes:

a line processing module, configured to: send a first time packet to a second node 1702 at a first working wavelength $\lambda_1$, and send a second time packet to the second node 1702 at a second working wavelength $\lambda_2$;

a packet processing module, configured to encapsulate the first time packet and the second time packet, where the first time packet carries sending time $t_{11}$ of the first time packet, and the second time packet carries sending time $t_{21}$ of the second time packet;

an 1588 protocol module, configured to execute the 1588 protocol, and synchronize local time of the second node 1702 to local time of the first node 1701 through the 1588 protocol; and a local time module, configured to: deliver the sending time $t_{11}$ of the first time packet and the sending time $t_{21}$ of the second time packet to the packet processing module, and deliver the local time to the 1588 protocol module.

A second node 1702 includes: a line processing module, a packet processing module, an 1588 protocol module, a time calculating module, and a local time module. For details of such modules, see the line processing module 1401, packet processing module 1402, 1588 protocol module 1405, time calculating module 1403, and local time module 1404 described in embodiment 13.

Embodiment 20

A time synchronization system includes at least two node devices, where:

A first node 1701 includes: a line processing module, a packet processing module, an 1588 protocol module, a time calculating module, and a local time module. For details of such modules, see the line processing module 1501, packet processing module 1502, 1588 protocol module 1505, time calculating module 1503, and local time module 1504 described in embodiment 14.

A second node 1702 includes:

a line processing module, configured to: receive the first time packet sent by a first node 1701 at the first working wavelength $\lambda_1$, and the second time packet sent by the first node 1701 at the second working wavelength $\lambda_2$;

send the sixth time packet to the first node 1701;

a packet processing module, configured to: record receiving time $t_{12}$ of the first time packet and receiving time $t_{22}$ of the second time packet; resolve the first time packet and the second time packet, and extract sending time $t_{11}$ of the first time packet carried in the first time packet, and sending time $t_{21}$ of the second time packet carried in the second time packet;

encapsulate the sixth time packet, where the sixth time packet carries a line distance $L_{1-2}$ from the first node to the second node or carries a path delay $d_{1-2}$ of transmitting an 1588 protocol packet from the first node 1701 to the second node 1702;

a time calculating module, configured to: calculate the line distance $L_{1-2}$ from the first node to the second node based on formula (4) below according to the sending time $t_{11}$ of the first time packet, the sending time $t_{21}$ of the second time packet, the receiving time $t_{12}$ of the first time packet, the receiving time $t_{22}$ of the second time packet, a first signal transmission rate $v_1$ corresponding to the first working wavelength, and a second signal transmission rate $v_2$ corresponding to the second working wavelength:

$$L_{1-2} = \frac{((t_{12} - t_{11}) - (t_{22} - t_{21})) \times v_1 \times v_2}{v_2 - v_1} \quad (4)$$

or configured to: use formula (5) below to calculate the path delay $d_{1-2}$ of transmitting the 1588 protocol packet from the first node 1701 to the second node 1702 according to the sending time $t_{11}$ of the first time packet, the sending time $t_{21}$ of the second time packet, the receiving time $t_{12}$ of the first time packet, the receiving time $t_{22}$ of the second time packet, the first signal transmission rate $v_1$ corresponding to the first working wavelength, the second signal transmission rate $v_2$ corresponding to the second working wavelength, and the signal transmission rate $V_{1-2}$ of the wavelength used for transmitting the 1588 protocol packet from the first node 1701 to the second node 1702:

$$\begin{aligned} d_{1-2} &= \frac{L_{1-2}}{V_{1-2}} \\ &= \frac{((t_{12} - t_{11}) - (t_{22} - t_{21})) \times v_1 \times v_2}{(v_2 - v_1) \times V_{1-2}} \end{aligned} \quad (5)$$

an 1588 protocol module, configured to execute the 1588 protocol, and synchronize local time of the first node 1701 to local time of the second node 1702 through the 1588 protocol;

and a local time module, configured to: deliver the receiving time $t_{12}$ of the first time packet and the receiving time $t_{22}$ of the second time packet to the packet processing module, and deliver the local time to the 1588 protocol module.

Embodiment 21

A time synchronization system includes at least two node devices, where:

A first node 1701 includes:

a line processing module, configured to: send a first time packet to a second node 1702 at a first working wavelength $\lambda_1$, and send a second time packet to the second node 1702 at a second working wavelength $\lambda_2$;

receive a third time packet sent by the second node 1702 at a third working wavelength $\lambda_3$, and receive a fourth time packet sent by the second node 1702 at a fourth working wavelength $\lambda_4$;

send an eighth time packet to the second node 1702;

a packet processing module, configured to encapsulate the first time packet and the second time packet, where the first time packet carries sending time $t_{11}$ of the first time packet, and the second time packet carries sending time $t_{21}$ of the second time packet;

record receiving time $t_{32}$ of the third time packet and receiving time $t_{42}$ of the fourth time packet; resolve the third time packet and the fourth time packet, and extract sending time $t_{31}$ of the third time packet carried in the third time packet, and sending time $t_{41}$ of the fourth time packet carried in the fourth time packet;

encapsulate the eighth time packet, where the eighth time packet carries a path delay $d_{2-1}$ of an 1588 protocol packet from the second node 1702 to the first node 1701;

a time calculating module, configured to calculate the path delay $d_{2-1}$ of the 1588 protocol packet from the second node 1702 to the first node 1701 based on formula (10) below according to the sending time $t_{31}$ of the third time packet, the sending time $t_{41}$ of the fourth time packet, the receiving time $t_{32}$ of the third time packet, the receiving time $t_{42}$ of the fourth time packet, the third signal transmission rate $v_3$ corresponding to the third working wavelength, the fourth signal transmission rate $v_4$ corresponding to the fourth working wavelength, and the signal transmission rate $V_{2-1}$ of the wavelength used for transmitting the 1588 protocol packet from the second node 1702 to the first node 1701:

$$d_{2-1} = \frac{L_{2-1}}{V_{2-1}} \qquad (10)$$
$$= \frac{((t_{32} - t_{31}) - (t_{42} - t_{41})) \times v_3 \times v_4}{(v_4 - v_3) \times V_{2-1}}$$

an 1588 protocol module, configured to execute the 1588 protocol, and synchronize local time of the second node 1702 to local time of the first node 1701 through the 1588 protocol; a local time module, configured to: deliver the sending time $t_{11}$ of the first time packet, the sending time $t_{21}$ of the second time packet, the receiving time $t_{32}$ of the third time packet, the receiving time $t_{42}$ of the fourth time packet to the packet processing module, and deliver the local time to the 1588 protocol module.

A second node 1702 includes: a line processing module, a packet processing module, an 1588 protocol module, a time calculating module, and a local time module. For details of such modules, see the line processing module 1601, packet processing module 1602, 1588 protocol module 1605, time calculating module 1603, and local time module 1604 described in embodiment 15.

The solutions of the present disclosure implement automatic real-time measurement of the absolute time deviation or 1588 time synchronization error between the master node and the slave node, and accomplish accurate time synchronization between nodes; solve the problem of time synchronization errors caused by the difference between the path delays in both directions in the prior art, and avoid the trouble of measuring and setting the bidirectional line distance and the time synchronization error manually in the process of deploying the time synchronization network. The solutions are easy to implement and highly practicable, and provide high measurement accuracy.

Persons skilled in the art should understand that all or part of the steps of the methods provided in the embodiments above may be implemented by a program instructing relevant hardware such as a hardware processor. The program may be stored in a computer readable storage medium accessible by the hardware processor. When the program runs, the program may execute the steps of the method specified in any embodiment above. The storage medium may be a ROM/RAM, magnetic disk, or CD-ROM.

The above descriptions are merely preferred embodiments of the present disclosure, but not intended to limit the protection scope of the present disclosure. Any modifications, variations or replacement that can be easily derived by persons skilled in the art shall fall within the protection scope of the present disclosure. Therefore, the protection scope of the present disclosure is subject to the appended claims.

What is claimed is:

1. A time synchronization method, wherein a first time packet is sent by a first node at a first time over a first working wavelength, and the first time packet carries a sending time of the first time packet, the method comprising:

receiving, by the first node, the first time packet at a second time;

receiving, by the second node, a second time packet at a fourth time, wherein the second time packet is sent by the first node at a third time over a second working wavelength, and the second time packet carries the sending time of the second time packet; and obtaining, by the second node, an absolute time deviation between the second node and the first node according to the first time, the second time, the third time, the fourth time, a first signal transmission rate corresponding to the first working wavelength, and a second signal transmission rate corresponding to the second working wavelength, wherein the first working wavelength is different from the second working wavelength; and synchronizing a local time of the second node with a local time of the first node according to the calculated absolute time deviation.

2. The method according to claim 1, wherein:
the absolute time deviation is obtained based on the following formula:

$$\text{Offset} = \frac{(t_{12} - t_{11}) \times v_1 - (t_{22} - t_{21}) \times v_2}{v_1 - v_2},$$

wherein

Offset represents the absolute time deviation;

$t_{11}$ represents the first time;

$t_{12}$ represents the second time;

$t_{21}$ represents the third time;

$t_{22}$ represents the fourth time;
$v_1$ represents the first signal transmission rate; and
$v_2$ represents the second signal transmission rate.

3. The method according to claim 1, further comprising:
extracting, by the second node, the first time carried in the first time packet, and the third time carried in the second time packet;
wherein the synchronizing the local time of the second node with the local time of the first node according to the absolute time deviation comprise:
subtracting the absolute time deviation from the local time of the second node to obtain a local time synchronized to the local time of the first node.

4. The method according to claim 1, further comprising:
sending, by the second node, a third time packet to the first node, wherein the third time packet carries the absolute time deviation, wherein the local time of the first node is synchronized to the local time of the second node according to the carried absolute time deviation.

5. A time synchronization method, wherein a first time packet is sent by a first node at a first time over a first working wavelength, and the first time packet carries a sending time of the first time packet, the method comprising:
receiving, by a second node, the a first time packet at a second time;
receiving, by the second node, a second time packet at a fourth time, wherein the second time packet is sent by the first node at a third time over a second working wavelength, and the second time packet carries the sending time of the second time packet; and
obtaining, by the second node, a time synchronization error between the second node and the first node according to the first time, the second time, the third time, the fourth time, a first signal transmission rate corresponding to the first working wavelength, a second signal transmission rate corresponding to the second working wavelength, a signal transmission rate of a wavelength used for transmitting an 1588 protocol packet from the first node to the second node, and a sum of path delays in both directions between the first node and the second node as calculated through the 1588 protocol, wherein the first working wavelength is different from the second working wavelength; and synchronizing a local time of the second node with a local time of the first node according to the time synchronization error.

6. The method according to claim 5, wherein:
the time synchronization error is obtained based on the following formula:

$$\Delta T = d_{1-2} - \frac{D}{2},$$

wherein
$\Delta T$ represents the time synchronization error;
D represents the sum of the path delays in both directions;
$d_{1-2}$ represents the path delay of transmitting an 1588 protocol packet from the first node to the second node, and is obtained based on the following formula:

$$d_{1-2} = \frac{L_{1-2}}{V_{1-2}}$$

$$= \frac{((t_{12} - t_{11}) - (t_{22} - t_{21})) \times v_1 \times v_2}{(v_2 - v_1) \times V_{1-2}},$$

wherein
$t_{11}$ represents the first time;
$t_{12}$ represents the second time;
$t_{21}$ represents the third time;
$t_{22}$ represents the fourth time;
$v_1$ represents the first signal transmission rate;
$v_2$ represents the second signal transmission rate;
$L_{1-2}$ represents a line distance from the first node to the second node; and
$V_{1-2}$ represents the signal transmission rate of a wavelength used for transmitting the 1588 protocol packet from the first node to the second node.

7. The method according to claim 5, further comprising:
extracting, by the second node, the first time carried in the first time packet, and the third time carried in the second time packet;
before the calculating the time synchronization error, the method further comprises:
obtaining, by the second node, the sum of the path delays in both directions;
and the synchronizing the local time of the second node with the local time of the first node according to the time synchronization error comprise:
adding the time synchronization error to the second node's local time synchronized through the 1588 protocol.

8. A time synchronization method, wherein a first time packet is sent by a first node at a first time over a first working wavelength and carries the first time, the method comprising:
receiving, by a second node, the a first time packet at a second time, and extracting the first time from the first packet;
receiving, by the second node, a second time packet at a fourth time, and extracting a third time from the second time packet, wherein the second time packet is sent by the first node at a third time over a second working wavelength and carries the third time;
sending, by the second node, a third time packet at a fifth time over a third working wavelength to the first node;
sending, by the second node, a fourth time packet at a seventh time over a fourth working wavelength to the first node;
receiving, by the second node, a fifth time packet that carries a sixth time when the first node receives the third time packet and an eighth time when the first node receives the fourth time packet;
obtaining, by the second node, a time synchronization error between the second node and the first node according to the first time, the second time, the third time, the fourth time, the fifth time, the sixth time, the seventh time, the eighth time, a first signal transmission rate corresponding to the first working wavelength, a second signal transmission rate corresponding to the second working wavelength, a third signal transmission rate corresponding to the third working wavelength, a fourth signal transmission rate corresponding to the fourth working wavelength, a signal transmission rate of a wavelength used for transmitting an 1588 protocol packet from the first node to the second node, and a signal transmission rate of a wavelength used for transmitting the 1588 protocol packet from the second node to the first node, wherein the first working wavelength is different from the second working wavelength, and the third working wavelength is different from the fourth working wavelength; and synchronizing a local time of the second node with a local time of the first node according to the calculated time synchronization error.

9. The method according to claim 8, wherein:
the time synchronization error is obtained based on the following formula:

$$\Delta T = \frac{d_{1-2} - d_{2-1}}{2}$$
$$= \frac{((t_{12} - t_{11}) - (t_{22} - t_{21})) \times v_1 \times v_2}{2 \times (v_2 - v_1) \times V_{1-2}} - \frac{d_{2-1}}{2},$$

wherein
ΔT represents the time synchronization error;
$t_{11}$ represents the first time;
$t_{12}$ represents the second time;
$t_{21}$ represents the third time;
$t_{22}$ represents the fourth time;
$v_1$ represents the first signal transmission rate;
$v_2$ represents the second signal transmission rate;
$V_{1-2}$ represents the signal transmission rate of the wavelength used for transmitting the 1588 protocol packet from the first node to the second node;
$d_{2-1}$ represents the path delay of transmitting an 1588 protocol packet from the second node to the first node, and is obtained based on the following formula:

$$d_{2-1} = \frac{((t_{32} - t_{31}) - (t_{42} - t_{41})) \times v_3 \times v_4}{(v_4 - v_3) \times V_{2-1}},$$

wherein
$t_{31}$ represents the fifth time;
$t_{32}$ represents the sixth time;
$t_{41}$ represents the seventh time;
$t_{42}$ represents the eighth time;
$v_3$ represents the third signal transmission rate;
$v_4$ represents the fourth signal transmission rate;
$V_{2-1}$ represents the signal transmission rate of the wavelength used for transmitting the 1588 protocol packet from the second node to the first node.

10. The method according to claim 9, wherein:
the time synchronization error is calculated according to the following formula:

$$\Delta T = \frac{((t_{12} - t_{11}) - (t_{22} - t_{21})) \times v_1 \times v_2}{(v_2 - v_1) \times V_{1-2}} - \frac{D}{2},$$

wherein
ΔT represents the time synchronization error;
$t_{11}$ represents the first time;
$t_{12}$ represents the second time;
$t_{21}$ represents the third time;
$t_{22}$ represents the fourth time;
$v_1$ represents the first signal transmission rate; and
$v_2$ represents the second signal transmission rate;
D represents the sum of the path delays in both directions; and
$V_{1-2}$ represents the signal transmission rate of a wavelength used for transmitting the 1588 protocol packet from the first node to the second node.

11. A node device, comprising:
a line processing module, configured to receive a first time packet sent by a first node over a first working wavelength, and a second time packet sent by the first node over a second working wavelength, wherein the first time packet carries the sending time of the first time packet, and the second time packet carries the sending time of the second time packet;
a packet processing module, configured to: record receiving time of the first time packet and receiving time of the second time packet; resolve the first time packet and the second time packet, and extract sending time of the first time packet carried in the first time packet, and sending time of the second time packet carried in the second time packet;
a time calculating module, configured to calculate an absolute time deviation between the node device and the first node according to the sending time of the first time packet, the sending time of the second time packet, the receiving time of the first time packet, the receiving time of the second time packet, a first signal transmission rate corresponding to the first working wavelength, and a second signal transmission rate corresponding to the second working wavelength; and
a local time module, configured to: deliver the receiving time of the first time packet and the receiving time of the second time packet to the packet processing module; and subtract the absolute time deviation from a local time of the node device to obtain a local time synchronized to a local time of the first node.

12. A node device, comprising:
a line processing module, configured to send a first time packet to a second node over a first working wavelength, send a second time packet to the second node over a second working wavelength, and receive a third time packet sent by the second node;
a packet processing module, configured to: encapsulate the first time packet and the second time packet, wherein the first time packet carries sending time of the first time packet, and the second time packet carries sending time of the second time packet; and resolve the third time packet and extract an absolute time deviation between the node device and the second node carried in the third time packet, wherein
the absolute time deviation is calculated by the second node according to the sending time of the first time packet, the sending time of the second time packet, receiving time of the first time packet, receiving time of the second time packet, a first signal transmission rate corresponding to the first working wavelength, and a second signal transmission rate corresponding to the second working wavelength; and
a local time module, configured to: deliver the sending time of the first time packet and the sending time of the second time packet to the packet processing module; and add the absolute time deviation to a local time of the node device to obtain a local time synchronized to a local time of the second node.

13. A node device, comprising:
a line processing module, configured to send a first time packet to a second node over a first working wavelength, send a second time packet to the second node over a second working wavelength, and receive a fourth time packet sent by the second node;
a packet processing module, configured to: encapsulate the first time packet and the second time packet, and record sending time of the first time packet and sending time of the second time packet; resolve the fourth time packet, and extract receiving time of the first time packet and receiving time of the second time packet carried in the fourth time packet;

a time calculating module, configured to calculate an absolute time deviation between the node device and the second node according to the sending time of the first time packet, the sending time of the second time packet, the receiving time of the first time packet, the receiving time of the second time packet, a first signal transmission rate corresponding to the first working wavelength, and a second signal transmission rate corresponding to the second working wavelength; and a local time module, configured to: deliver the sending time of the first time packet and the sending time of the second time packet to the packet processing module; and add the absolute time deviation to a local time of the node device to obtain a local time synchronized to a local time of the second node.

14. A node device, comprising:

a line processing module, configured to receive a first time packet sent by a first node over a first working wavelength, and a second time packet sent by the first node over a second working wavelength;

a packet processing module, configured to: record receiving time of the first time packet and receiving time of the second time packet; the first time packet and the second time packet, and extract sending time of the first time packet carried in the first time packet, and sending time of the second time packet carried in the second time packet;

an 1588 protocol module, configured to execute the 1588 protocol to obtain a sum of path delays in both directions between the first node and the second node, and synchronize a local time of the node device to a local time of the first node through the 1588 protocol;

a time calculating module, configured to calculate a time synchronization error between the node device and the first node according to the sending time of the first time packet, the sending time of the second time packet, the receiving time of the first time packet, the receiving time of the second time packet, a first signal transmission rate corresponding to the first working wavelength, a second signal transmission rate corresponding to the second working wavelength, a signal transmission rate of a wavelength used for transmitting an 1588 protocol packet from the first node to the second node, and the sum of the path delays in both directions; and a local time module, configured to: deliver the receiving time of the first time packet and the receiving time of the second time packet to the packet processing module, deliver the local time to the 1588 protocol module, and add the time synchronization error to the node device's local time synchronized through the 1588 protocol.

15. A node device, comprising:

a line processing module, configured to send a first time packet to a second node over a first working wavelength, send a second time packet to the second node over a second working wavelength, and receive a sixth time packet sent by the second node;

a packet processing module, configured to: encapsulate the first time packet and the second time packet, wherein the first time packet carries sending time of the first time packet, and the second time packet carries sending time of the second time packet; and resolve the sixth time packet and extract a line distance from the first node to the second node or a path delay of transmitting an 1588 protocol packet from the first node to the second node carried in the sixth time packet, wherein the line distance from the first node to the second node is calculated by the second node according to the sending time of the first time packet, the sending time of the second time packet, receiving time of the first time packet, receiving time of the second time packet, a first signal transmission rate corresponding to the first working wavelength, and a second signal transmission rate corresponding to the second working wavelength;

the path delay of transmitting the 1588 protocol packet from the first node to the second node is calculated by the second node according to the sending time of the first time packet, the sending time of the second time packet, the receiving time of the first time packet, the receiving time of the second time packet, the first signal transmission rate corresponding to the first working wavelength, the second signal transmission rate corresponding to the second working wavelength, and a signal transmission rate of a wavelength used for transmitting the 1588 protocol packet from the first node to the second node;

an 1588 protocol module, configured to execute the 1588 protocol to obtain a sum of path delays in both directions between the first node and the second node, and synchronize a local time of the node device to a local time of the second node through the 1588 protocol;

a time calculating module, configured to calculate a time synchronization error between the second node and the first node according to the line distance from the first node to the second node, the signal transmission rate of the wavelength used for transmitting the 1588 protocol packet from the first node to the second node, and the sum of the path delays in both directions between the first node and the second node; or according to the path delay of transmitting the 1588 protocol packet from the first node to the second node, and the sum of the path delays in both directions between the first node and the second node; and a local time module, configured to: deliver the sending time of the first time packet and the sending time of the second time packet to the packet processing module, deliver the local time to the 1588 protocol module, and subtract the time synchronization error from the node device's local time synchronized through the 1588 protocol.

16. A node device, comprising:

a line processing module, configured to: receive a first time packet sent by a first node over a first working wavelength and a second time packet sent by the first node over a second working wavelength; send a third time packet to the first node over a third working wavelength, and send a fourth time packet to the first node over a fourth working wavelength; and receive an eighth time packet sent by the first node;

a packet processing module, configured to: record receiving time of the first time packet and receiving time of the second time packet; resolve the first time packet and the second time packet, and extract sending time of the first time packet carried in the first time packet, and sending time of the second time packet carried in the second time packet; encapsulate the third time packet and the fourth time packet, wherein the third time packet carries sending time of the third time packet, and the fourth time packet carries sending time of the fourth time packet; and resolve the eighth time packet and extract a path delay of transmitting an 1588 protocol packet from the second node to the first node carried in the eighth time packet, wherein:

the path delay of transmitting the 1588 protocol packet from the second node to the first node is calculated by the first node according to the sending time of the third time packet, the sending time of the fourth time packet, the receiving time of the third time packet, the receiving time of the fourth time packet, a third transmission rate corresponding to the third working wavelength, a fourth transmission rate corresponding to the fourth working wavelength, and a signal transmission rate of a wavelength used for transmitting the 1588 protocol packet from the second node to the first node;

an 1588 protocol module, configured to execute the 1588 protocol, and synchronize a local time of the node device to a local time of the first node through the 1588 protocol;

a time calculating module, configured to calculate a time synchronization error between the second node and the first node according to the sending time of the first time packet, the sending time of the second time packet, the receiving time of the first time packet, the receiving time of the second time packet, a first signal transmission rate corresponding to the first working wavelength, a second signal transmission rate corresponding to the second working wavelength, the path delay of transmitting the 1588 protocol packet from the second node to the first node, the signal transmission rate of the wavelength used for transmitting the 1588 protocol packet from the first node to the second node; and a local time module, configured to: deliver the receiving time of the first time packet, the receiving time of the second time packet, the sending time of the third time packet, and the sending time of the fourth time packet to the packet processing module, deliver the local time to the 1588 protocol module, and add the time synchronization error to the node device's local time synchronized through the 1588 protocol.

17. A time synchronization method, comprising:

sending, by a first node, a first time packet at a first time over a first working wavelength to a second node;

sending, by the first node, a second time packet at a third time over a second working wavelength to the second node;

receiving, by the first node, a third time packet sent by the second node, and extracting a second time and a fourth time carried in the third time packet, wherein the second time is the time when the second node receives the first time packet, and the fourth time is the time when the second node receives the second time packet;

obtaining, by the first node, an absolute time deviation between the second node and the first node according to the first time, the second time, the third time, the fourth time, a first signal transmission rate corresponding to the first working wavelength, and a second signal transmission rate corresponding to the second working wavelength, wherein the first working wavelength is different from the second working wavelength; and synchronizing a local time of the second node with a local time of the first node according to the calculated absolute time deviation.

18. A time synchronization method, comprising:

sending, by a first node, a first time packet at a first time over a first working wavelength to a second node, wherein the first time packet carries the sending time of the first time packet;

sending, by the first node, a second time packet at a third time over a second working wavelength to the second node, wherein the second time carries the sending time of the second time packet;

receiving, by the first node, a third time packet sent by the second node, wherein the third time packet carries a line distance from the first node to the second node or a path delay of transmitting the 1588 protocol packet from the first node to the second node, and the line distance or the path delay is calculated by the second node according to the first time, a second time, the third time, a fourth time, a first signal transmission rate corresponding to the first working wavelength, and a second signal transmission rate corresponding to the second working wavelength, wherein the second time is the time when the second node receives the first time packet, and the fourth time is the time when the second node receives the second time packet;

extracting, by the first node, the line distance or the path delay from the third time packet;

obtaining, by the first node, a sum of the path delay in both directions between the first node and the second node, wherein the sum of the path delay is obtained by the 1588 protocol;

obtaining, by the first node, a time synchronization error, wherein obtaining the time synchronization error comprises:

obtaining the time synchronization error according to the line distance, a signal transmission rate used for transmitting the 1588 protocol packet from the first node to the second node and the sum of the path delay in both directions between the first node and the second node; or obtaining the time synchronization error according to the path delay of transmitting the 1588 protocol packet from the first node to the second node and the sum of the path delay in both directions between the first node and the second node;

and synchronizing, by the first node, its local time to the local time of the second node according to the time synchronization error.

19. The method according to claim 18, wherein:

the time synchronization error is obtained through the following formula:

$\Delta T = d_{1\text{-}2} - D/2 = L_{1\text{-}2}/V_{1\text{-}2} - D/2$, wherein $\Delta T$ represents the time synchronization error;

D represents the sum of the path delays in both directions;

$V_{1\text{-}2}$ represents the signal transmission rate of a wavelength used for transmitting the 1588 protocol packet from the first node to the second node;

$L_{1\text{-}2}$ represents the line distance, and $d_{1\text{-}2}$ represents the path delay of transmitting an 1588 protocol packet from the first node to the second node, and is obtained through the following formula:

$d_{1\text{-}2} = L_{1\text{-}2}/V_{1\text{-}2} = (((t_{12}-t_{11})-(t_{22}t_{21})) \times v_1 \times v_2)/((v_2-v_1) \times V_{1\text{-}2})$ $t_{11}$ represents the first time;
$t_{12}$ represents the second time;
$t_{21}$ represents the third time;
$t_{22}$ represents the fourth time;
$v_1$ represents the first signal transmission rate; and
$v_2$ represents the second signal transmission rate.

20. A time synchronization method, comprising:

sending, by a first node, a first time packet at a first time over a first working wavelength to a second node;

sending, by the first node, a second time packet at a third time over a second working wavelength to the second node;

receiving, by the first node, a third time packet sent by the second node, and extracting a second time and a fourth time carried in the third time packet, wherein the second time is the time when the second node receives the first time packet, and the fourth time is the time when the second node receives the second time packet;

obtaining, by the first node, a sum of the path delay in both directions between the first node and the second node, wherein the sum of the path delay is obtained through an 1588 protocol;

obtaining, by the first node, the time synchronization error according to the first time, the second time, the third time, the fourth time, a first signal transmission rate corresponding to the first working wavelength, and a second signal transmission rate corresponding to the second working wavelength, a signal transmission rate of a wavelength used for transmitting the 1588 protocol packet from the first node to the second node, and the sum of the path delay in both directions between the first node and the second node; and synchronizing, by the first node, its local time to the local time of the second node according to the time synchronization error.

21. A time synchronization method, comprising:

receiving, by a second node, a first time packet at a second time, and extracting a first time from the first time packet, wherein the first time packet is sent by a first node at a first time over a first working wavelength and carries the first time;

receiving, by the second node, a second time packet at a fourth time, and extracting a third time from the second time packet, wherein the second time packet is sent by the first node at a third time over a second working wavelength and carries the third time;

sending, by the second node, a third time packet at a fifth time over a third working wavelength to the first node, wherein the third time packet carries the fifth time;

sending, by the second node, a fourth time packet at a seventh time over a fourth working wavelength to the first node, wherein the fourth time packet carries the seventh time;

receiving, by the second node, a fifth time packet sent by the first node, wherein the fifth time packet carries a line distance from the second node to the first node, or carries a path delay of transmitting the 1588 protocol packet from the second node to the first node, wherein the line distance is calculated by the first node through the following formula:

$$L_{2-1} = \frac{((t_{32} - t_{31}) - (t_{42} - t_{41})) \times v_3 \times v_4}{v_4 - v_3},$$

wherein
 $L_{2-1}$ represents the line distance from the second node to the first node;
 $t_{31}$ represents the fifth time;
 $t_{32}$ represents a sixth time at which the first node receives the third time packet;
 $t_{41}$ represents the seventh time;
 $t_{42}$ represents an eighth time at which the first node receives the fourth time packet;
 $v_3$ represents a signal transmission rate of a signal over the third working wavelength; and
 $v_4$ represents a signal transmission rate of a signal over the fourth working wavelength;
 wherein the path delay is calculated by the first node through the following formula:

$$d_{2-1} = \frac{((t_{32} - t_{31}) - (t_{42} - t_{41})) \times v_3 \times v_4}{(v_4 - v_3) \times V_{2-1}},$$

wherein
 $d_{2-1}$ represents the path delay of transmitting an 1588 protocol packet from the second node to the first node;
 $t_{31}$ represents the fifth time;
 $t_{32}$ represents a sixth time at which the first node receives the third time packet;
 $t_{41}$ represents the seventh time;
 $t_{42}$ represents an eighth time at which the first node receives the fourth time packet;
 $v_3$ represents a signal transmission rate of a signal over the third working wavelength;
 $v_4$ represents a signal transmission rate of a signal over the fourth working wavelength; and
 $V_{2-1}$ represents the signal transmission rate of the wavelength used for transmitting the 1588 protocol packet from the second node to the first node;

obtaining, by the second node, a time synchronization error between the second node and the first node;

synchronizing local time of the second node with local time of the first node according to the time synchronization error;

wherein the obtaining the time synchronization error between the second node and the first node comprises:

obtaining the time synchronization error according to the line distance, the first time, the second time, the third time, the fourth time, a first signal transmission rate corresponding to the first working wavelength, a second signal transmission rate corresponding to the second working wavelength, a signal transmission rate of a wavelength used for transmitting an 1588 protocol packet from the first node to the second node, and a signal transmission rate of a wavelength used for transmitting the 1588 protocol packet from the second node to the first node, or obtaining the time synchronization error according to the path delay, the first time, the second time, the third time, the fourth time, the first signal transmission rate, the second signal transmission rate, and the signal transmission rate of the wavelength used for transmitting the 1588 protocol packet from the first node to the second node.

22. The method according to the claim 21, when the fifth time packet carries the line distance, the time synchronization error is obtained through the following formula:

$$\Delta T = \frac{((t_{12} - t_{11}) - (t_{22} - t_{21})) \times v_1 \times v_2}{2 \times (v_2 - v_1) \times V_{1-2}} - \frac{L_{2-1}}{2 \times V_{2-1}},$$

wherein
 $\Delta T$ represents the time synchronization error;
 $L_{2-1}$ represents the line distance;
 $t_{11}$ represents the first time;
 $t_{12}$ represents the second time;
 $t_{21}$ represents the third time;

$t_{22}$ represents the fourth time;
$v_1$ represents the first signal transmission rate; and
$v_2$ represents the second signal transmission rate;
$V_{1-2}$ represents the signal transmission rate of the wavelength used for transmitting the 1588 protocol packet from the first node to the second node; and
$V_{2-1}$ represents the signal transmission rate of the wavelength used for transmitting the 1588 protocol packet from the second node to the first node; and
when the fifth time packet carries the path delay, the time synchronization error is obtained through the following formula:

$$\Delta T = \frac{((t_{12} - t_{11}) - (t_{22} - t_{21})) \times v_1 \times v_2}{2 \times (v_2 - v_1) \times V_{1-2}} - \frac{d_{2-1}}{2},$$

wherein
$d_{2-1}$ represents the path delay.

* * * * *